(12) United States Patent
Park et al.

(10) Patent No.: US 9,915,768 B2
(45) Date of Patent: Mar. 13, 2018

(54) WIRE GRID POLARIZER PLATE AND DISPLAY DEVICE INCLUDING THE SAME

(71) Applicant: Samsung Display Co. Ltd., Yongin (KR)

(72) Inventors: Seung Won Park, Seoul (KR); Tae Woo Kim, Seoul (KR); Min Hyuck Kang, Seoul (KR); Dae Ho Yoon, Seoul (KR); Moon Gyu Lee, Suwon-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 1 day.

(21) Appl. No.: 14/990,334

(22) Filed: Jan. 7, 2016

(65) Prior Publication Data
US 2016/0313481 A1 Oct. 27, 2016

(30) Foreign Application Priority Data
Apr. 24, 2015 (KR) .................. 10-2015-0057980

(51) Int. Cl.
*G02B 5/30* (2006.01)
*G02F 1/1335* (2006.01)

(52) U.S. Cl.
CPC ..... *G02B 5/3058* (2013.01); *G02F 1/133528* (2013.01); *G02F 2001/13355* (2013.01); *G02F 2001/133548* (2013.01)

(58) Field of Classification Search
CPC .. G02B 5/1848; G02B 5/1861; G02B 5/1866; G02B 27/286
USPC ......... 359/485.05, 487.03, 486.01, 352, 569, 359/572, 576; 352/311, 321; 428/167
See application file for complete search history.

(56) References Cited

U.S. PATENT DOCUMENTS 8,913,320 B2 * 12/2014 Davis .................. G02B 5/3058
359/485.05
2005/0219696 A1 * 10/2005 Albert ................. G02B 5/3058
359/486.01

(Continued)

FOREIGN PATENT DOCUMENTS

EP       3023820        5/2016
JP     2010224232      10/2010

(Continued)

OTHER PUBLICATIONS

European Search Report—European Patent Application No. 16163992.7 dated Aug. 24, 2016.

*Primary Examiner* — Jie Lei
(74) *Attorney, Agent, or Firm* — Cantor Colburn LLP

(57) ABSTRACT

The wire grid polarizer plate includes a light permeable substrate and a conductive pattern layer arranged on one surface of the light permeable substrate, the conductive pattern layer includes window regions and at least one reflective region arranged in a rectangular region which is circumscribed to the window regions, the window regions have target patterns including conductive simple closed curves surrounding in piles, spaced apart from each other at an interval of a period which is shorter than a wavelength of incident light, transmit first polarized light of the incident light and reflect second polarized light which is perpendicular to the first polarized light and the reflective regions reflect both of the first polarized light and the second polarized light.

8 Claims, 34 Drawing Sheets

(56) References Cited

U.S. PATENT DOCUMENTS

| | | | |
|---|---|---|---|
| 2010/0328768 A1* | 12/2010 | Lines | G02B 5/0252 359/485.05 |
| 2011/0141422 A1* | 6/2011 | Yanagawa | G02F 1/133536 349/139 |
| 2013/0201557 A1* | 8/2013 | Davis | G02B 5/3058 359/486.01 |
| 2014/0028956 A1 | 1/2014 | Choi et al. | |
| 2014/0187054 A1 | 7/2014 | Park et al. | |
| 2015/0070762 A1 | 3/2015 | An et al. | |

FOREIGN PATENT DOCUMENTS

| | | |
|---|---|---|
| JP | 2010224232 A * | 10/2010 |
| KR | 1020080024316 | 3/2008 |
| KR | 1020100110358 | 10/2010 |
| KR | 1020110101893 | 9/2011 |
| KR | 1020120105694 | 9/2012 |
| KR | 1020140030382 | 3/2014 |
| KR | 1020140030873 | 3/2014 |
| KR | 1020140137734 | 12/2014 |
| WO | 2009099769 | 8/2009 |

\* cited by examiner

WIRE GRID POLARIZER PLATE AND DISPLAY DEVICE INCLUDING THE SAME

This application claims priority to Korean Patent Application No. 10-2015-0057980, filed on Apr. 24, 2015, and all the benefits accruing therefrom under 35 U.S.C. § 119, the content of which in its entirety is incorporated herein by reference.

BACKGROUND

1. Field

The invention relates to a wire grid polarizer plate and a display device including the same.

2. Description of the Prior Art

A parallel conductive wire array in which parallel conductor wires are arranged to polarize only a specific polarized light in an electromagnetic wave is generally referred to as a wire grid.

A wire grid structure having a period that is shorter than a wavelength of corresponding light has a polarization characteristic that it reflects a polarized light in a wire direction and permeates a polarized light that is perpendicular to the wire direction with respect to a non-polarized incident light. Accordingly, the wire grid structure has the advantage that it can reuse the reflected polarized light in comparison to an absorption type polarizer.

SUMMARY

Accordingly, the invention has been made to solve the above-mentioned problems occurring in the related art, and one subject to be solved by the invention is to provide a wire grid polarizer plate having an improved light efficiency and a display device including the same.

Additional advantages, subjects, and features of the invention will be set forth in part in the description which follows and in part will become apparent to those having ordinary skill in the art upon examination of the following or may be learned from practice of the invention.

A wire grid polarizer plate according to an embodiment of the invention includes a light permeable substrate and a conductive pattern layer arranged on one surface of the light permeable substrate, the conductive pattern layer includes window regions and at least one reflective region arranged in a rectangular region which is circumscribed to the window regions, the window regions have target patterns including conductive simple closed curves surrounding in piles, spaced apart from each other at an interval of a period which is shorter than a wavelength of incident light, transmit first polarized light of the incident light and reflect second polarized light which is perpendicular to the first polarized light and the reflective regions reflect both of the first polarized light and the second polarized light.

A display device according to an embodiment of the invention, includes the wire grid polarizer plate according to an embodiment of the invention and an opaque layer arranged on an upper portion of the wire grid polarizer plate according to an embodiment of the invention. The target patterns include first linear structures that extend in one direction and second linear structures that do not extend in the one direction, and the opaque layer covers the second linear structures.

In an exemplary embodiment, the conductive simple closed curves may comprise polygonal simple closed curves which include two first linear structures that extend in one direction and three or more second linear structures that do not extend in the one direction.

In an exemplary embodiment, the polygonal simple closed curves may be straight hexagonal simple closed curves.

In an exemplary embodiment, the conductive simple closed curves may comprise non-polygonal simple closed curves which include two first linear structures that extend in one direction and two or more second linear structures that do not extend in the one direction.

In an exemplary embodiment, the non-polygonal simple closed curves may comprise arch structures.

In an exemplary embodiment, the non-polygonal simple closed curve may comprise modified straight hexagonal simple closed curves of which at least one short side is a curve.

In an exemplary embodiment, the wire grid polarizer plate may further comprise third linear structures that extend in the one direction. The third linear structures may be arranged between the reflective regions.

According to embodiments of the invention, it becomes possible to provide a wire grid polarizer plate having an improved light efficiency and a display device including the same.

The effects according to the invention are not limited to the contents as exemplified above, but more various effects are described in the specification of the invention.

BRIEF DESCRIPTION OF THE DRAWINGS

The above and other exemplary embodiments, features and advantages of the invention will be more apparent from the following detailed description taken in conjunction with the accompanying drawings, in which.

DETAILED DESCRIPTION

Figure 1:
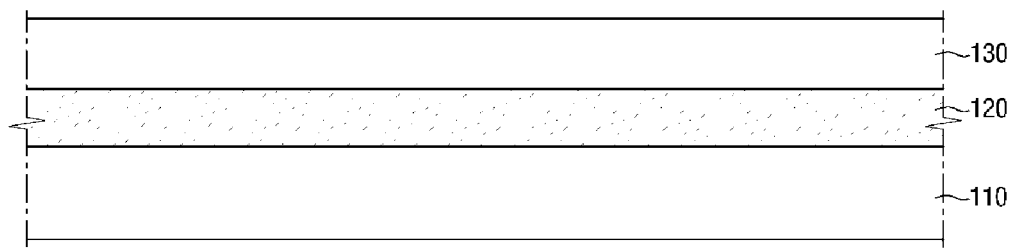
FIGS. 1 to 10 are cross-sectional views explaining an exemplary embodiment of a method for fabricating a wire grid polarizer plate according to the invention.

Features of the invention and methods of accomplishing the same may be understood more readily with reference to the following detailed description of exemplary embodiments and the accompanying drawings. The invention may be embodied in many different forms and should not be construed as being limited to the embodiments set forth herein. Rather, these embodiments are provided so that this disclosure sufficiently conveys the invention to one of ordinary skill in the relevant art.

In the drawings, the thicknesses of layers and regions may be exaggerated for clarity. It will be understood that when an element or layer is referred to as being "on," "connected to" or "coupled to" another element or layer, the element or layer can be directly on, connected or coupled to another element or layer, or with one or more intervening elements or layers being present. In contrast, when an element is referred to as being "directly on," "directly connected to" or "directly coupled to" another element or layer, there are no intervening elements or layers present. As used herein, connected may refer to elements being physically, electrically, operably, and/or fluidly connected to each other.

Like numbers refer to like elements throughout. As used herein, the term "and/or" includes any and all combinations of one or more of the associated listed items.

It will be understood that, although the terms "first," "second," "third," etc. may be used herein to describe various elements, components, regions, layers and/or sections, the elements, components, regions, layers and/or sections should not be limited by those terms. Instead, those terms are merely used to distinguish one element, component, region, layer or section from another element, component, region, layer or section. Thus, a first element, component, region, layer or section described below could be easily termed a second element, component, region, layer or section without departing from the teachings of the present disclosure.

Spatially relative terms, such as "below," "lower," "under," "above," "upper" and the like, may be used herein to describe the spatial relationship of one element or feature to another element(s) or feature(s) as illustrated in the figures. It will be understood that the spatially relative terms are intended to encompass different orientations of the device during use or operation, in addition to the orientation depicted in the figures. For example, if the device in the figures is turned over, elements described as "below" or "beneath" relative to other elements or features would then be oriented "above" relative to the other elements or features. Thus, the example term "below" can encompass both an orientation of above and below, depending on the orientation of the elements. The device may be otherwise oriented (rotated 90 degrees or at other orientations) and the spatially relative descriptors used herein interpreted accordingly.

The terminology used herein is for the purpose of describing certain embodiments and is not intended to limit the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. Further, the use of "may" when describing embodiments refers to "one or more embodiments." Also, the term "example" is intended to refer to an example or illustration. As used herein, the terms "use," "using," and "used" may be considered synonymous with the terms "utilize," "utilizing," and "utilized," respectively.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described with reference to the drawings.

FIGS. 1 to 10 are cross-sectional views explaining a method for fabricating a wire grid polarizer plate according to a first embodiment of the invention.

Referring to FIG. 1, a base substrate may include a light permeable substrate 110, a conductive layer 120, and a guide layer 130.

The light permeable substrate 110 can transmit visible light and the material of the light permeable substrate 110 can be properly selected to match the purpose or processing thereof. In an exemplary embodiment, the light permeable substrate 110 may include various polymer compounds, such as glass, quarts, acryl, triacetylcellulose ("TAC"), cyclic olefin copolymer ("COP"), cyclic olefin polymer ("COC"), polycarbonate ("PC"), polyethylene naphthalate ("PET"), polyimide ("PI"), polyethylene naphthalate ("PEN"), polyether sulfone ("PES"), and polyarylate ("PAR"), but is not limited thereto. In an exemplary embodiment, the light permeable substrate 110 may include an optical film base material having a predetermined degree of flexibility.

The conductive layer 120 may be disposed on the light permeable substrate 110. The conductive layer 120 may cover the whole surface of the light permeable substrate 110. The conductive layer 120 may include any conductive material without limitation. In an exemplary embodiment, the conductive layer 120 may include metal, and specifically, may include one of aluminum (Al), chrome (Cr), silver (Ag), copper (Cu), nickel (Ni), titanium (Ti), cobalt (Co), molybdenum (Mo), and an alloy thereof, but is not limited thereto.

According to circumstances, the conductive layer 120 may have a multilayer structure that includes two or more layers. In an exemplary embodiment, a first conductive layer (not illustrated) may include aluminum, and a second conductive layer (not illustrated) may include titanium or molybdenum, but the first and second conductive layers are not limited thereto. In the case where the first conductive layer (not illustrated) includes aluminum, hillock may occur or an upper surface thereof may become non-uniform depending on a processing temperature in the subsequent process, and this may cause the optical characteristic of a display device to deteriorate. In order to prevent this, the second conductive layer (not illustrated) that includes titanium or molybdenum may be disposed on the first conductive layer (not illustrated) so as to prevent the hillock from occurring in the process.

In an exemplary embodiment, the conductive layer 120 may be provided using sputtering, chemical vapor deposition, or evaporation, for example, but is not limited thereto.

The guide layer 130 may be disposed on the conductive layer 120. In an exemplary embodiment, the guide layer 130 may be a resin layer and the resin layer may be photoresist layer, but is not limited thereto. The guide layer 130 may cover the whole surface of the conductive layer 120.

Figure 2:
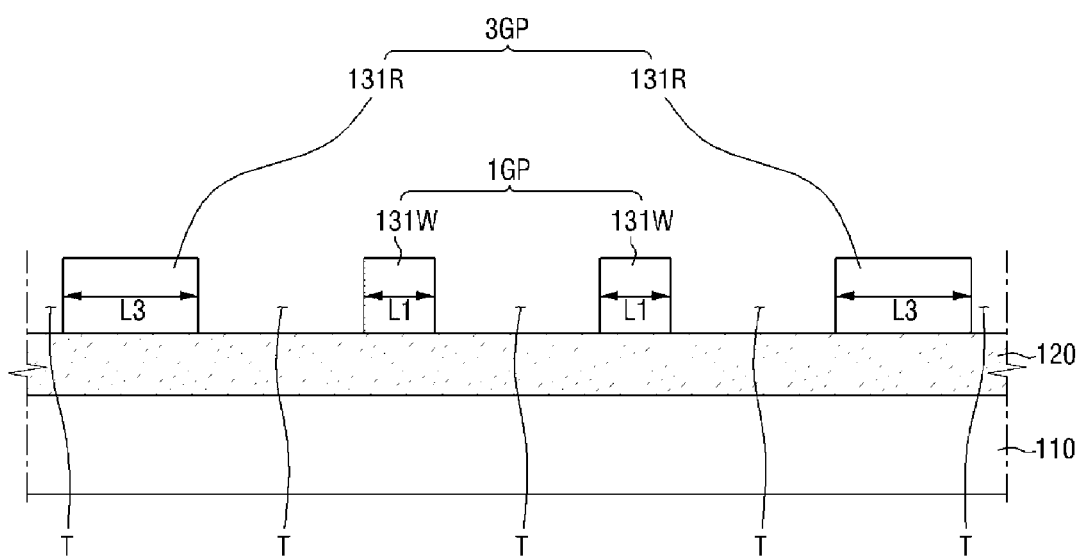

Referring to FIGS. 1 and 2, a step of providing first guide pattern layers 1GP, 3GP, and T through patterning of the guide layer 130 will be described in detail. Referring to FIGS. 1 and 2, the first guide pattern layers 1GP, 3GP, and T may include first and third guide patterns 1GP and 3GP and first trenches T. In the case where the guide layer 130 includes photoresist, first guide partitions 131W and third guide partitions 131R may be provided by exposing and developing the guide layer 130 to match the pattern using a mask or the like. However, this is merely exemplary, and various patterning techniques may be used.

The first guide pattern 1GP may include the first guide partitions 131W that are spaced apart from each other. The third guide pattern 3GP may include the third guide partitions 131R that are spaced apart from each other. The first trenches T may expose parts of the conductive layer 120 between the first guide partitions 131W, between the third guide partitions 131R, and between the first guide partitions 131W and the third guide partitions 131R.

The first guide partitions 131W may be provided with a first width L1, and the third guide partitions 131R may be provided with a third width L3. The first width L1 may be narrower than the third width L3. In other words, the third width L3 of the third guide partitions 131 R is wider than the first width L1 of the first guide partitions 131W.

Figure 3:
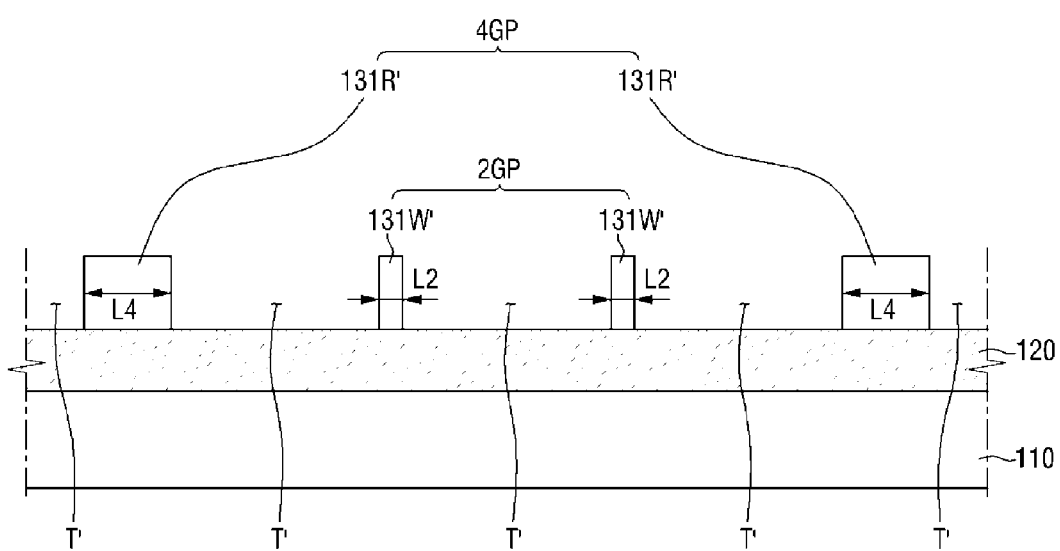

Referring to FIGS. 2 and 3, a trimming process may be performed to provide second and fourth guide patterns 2GP and 4GP through reduction of the widths of the first and third guide patterns 1GP and 3GP, for example. Through the trimming process, the first guide pattern layers 1GP, 3GP, and T may become the second guide pattern layers 2GP, 4GP, and T'. The first guide partitions 131W may become second guide partitions 131W', and the third guide partitions 131R may become fourth guide partitions 131R'. The first trench T may become the second trench T'.

After the trimming process, a second width L2 of the second guide partitions 131W' becomes narrower than the first width L1 of the first guide partitions 131W, and a fourth width L4 of the fourth guide partitions 131R' becomes narrower than the third width L3 of the third guide partitions 131R. The width of the second trench T' becomes wider than the width of the first trench T. According to circumstances, through the trimming process, the width of the second guide partitions 131W' may be reduced even to a level which approaches or is substantially equal to the width of domains 141 and 142 (in FIG. 5) having self-aligned block copolymer nanostructures to be described later.

As the first and third widths L1 and L3 of the first and third guide partitions 131W and 131R become reduced, the aperture ratio and the permeability of the wire grid polarizer plate may become heightened. Specifically, as the first and third widths L1 and L3 of the first and third guide partitions 131W and 131R become reduced, the number of domains 141 and 142 (in FIG. 5) having self-assembled block copolymer nanostructures, which are to be provided in the second trench T' between the second and fourth guide partitions 131W' and 131R', may be increased, and thus the aperture ratio of the wire grid polarizer plate may be heightened. The domains having the self-assembled block copolymer nanostructures will be described later with reference to FIG. 5.

In an exemplary embodiment, the trimming process may be performed using a plasma etching process, for example. Plasma that is used in the trimming process is not specially limited so far as it can reduce the first and third widths L1 and L3 of the first and third guide partitions 131W and 131R. In an unlimited exemplary embodiment, the trimming process may be performed using oxygen ($O_2$) plasma, for example.

The second guide pattern 2GP may serve as a mask for forming third linear structures 3WS (in FIG. 13) of linear lattice patterns to be described later, and the fourth guide pattern 4GP may serve as a mask for forming reflective patterns RF (in FIG. 13) to be described later.

The second guide pattern 2GP may include the second guide partitions 131W' that are spaced apart from each other, and the fourth guide pattern 4GP may include the fourth guide partitions 131R' that are spaced apart from each other.

Figure 4:
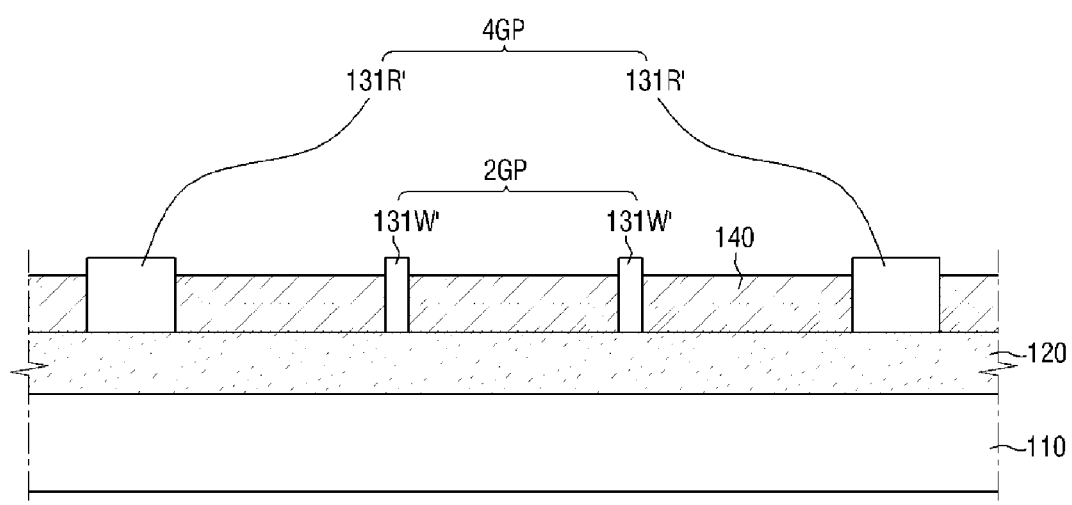

Referring to FIGS. 3 and 4, a block copolymer layer 140 may be provided in the second trench T' between the second and fourth guide partitions 131W' and 131R'. The block copolymer may include first repetition units and second repetition units. In an exemplary embodiment, the block copolymer may include at least one of PS-b-PB(polystyrene-b-polybutadiene), PS-b-PI(polystyrene-b-polyisoprene), PS-b-PMMA(polystyrene-b-poly(methyl methacrylate)), PS-b-P2VP(polystyrene-b-poly(2-vinylpyridine)), PS-b-PFDMS (polystyrene-b-poly(ferrocenyl-dimethylsilane)), PS-b-PtBA(polystyrene-b-poly(tert-butylacrylate)), PS-b-PFEMS (polystyrene-b-poly(ferrocenylethylmethylsilane)), PI-b-PEO(polyisoprene-b-poly(ethyleneoxide)), PB-b-PVP (polybutadiene-b-poly(butadiene-b-vinylpyridinium)), PtBA-b-PCEMA(poly(tert-butylacrylate)-b-poly(cinnamoyl-ethylmethacrylate)), PS-b-PLA(polystyrene-b-polyactide), PαMS -b-PHS(poly(α-methylstyrene)-b-poly(4-hydroxystyrene)), PPDPS -b-P4VP(pentadecyl phenol modified polystyrene-b-poly(4-vinylpyridine)), PS-b-PEO (poly(styrene-b-ethyleneoxide)), PS-b-PDMS(polystyrene-b-poly(dimethyl siloxane)), PS-b-PE(polystyrene-b-polyethylene)), PS-b-PFS(polystyrene-b-poly(ferrocenyl dimethyl silane)), PS-b-PPP(polystyrene-b-poly(paraphenylene)), PS-b-PB-b-PS, PS-b-PI-b-PS, PEO-b-PPO(Poly(propyleneoxide))-b-PEO, PVPDMPS(poly(4-vinyl-phenyldimethyl-2-propoxysilane))-b-PI-b-PVPDMPS, PS-b-P2VP-b-PtBMA, or their block copolymers, for example.

The first repetition units and the second repetition units have different chemical properties. The first repetition units and the second repetition units may be microphase-separated through self-assembly. The first repetition units and the second repetition units have different etch rates. One of the first repetition units and the second repetition units may have a selective affinity with respect to the second and fourth guide partitions 131W' and 131R'. As described later, one of the first domains in which the first repetition units are self-aligned and the second domains in which the second repetition units are self-aligned may be selectively removed.

Although not illustrated, before the block copolymer layer 140 is provided in the second trench T', a neutral layer (not illustrated) may be disposed on a bottom portion of the second trench T', i.e., on the conductive layer 120 in the second trench T'. The neutral layer (not illustrated) may be provided using a material that is almost similar to surface energy of the block copolymer. Since the neutral layer (not illustrated) does not have the selective affinity with respect to the first repetition units or the second repetition units of the block copolymer, it becomes possible to control vertical alignment of the first repetition units and the second repetition units of the block copolymer.

In an exemplary embodiment, the neutral layer (not illustrated) may be random copolymers of monomers of the block copolymer, for example, but is not limited thereto.

An example of the random copolymer may include at least one of PS-r-PB(polystyrene-r-polybutadiene)), PS-r-PI (polystyrene-r-polyisoprene), PS -r-PMMA(polystyrene-r-poly(methyl methacrylate)), PS-r-P2VP(polystyrene-r-poly(2-vinylpyridine)), PS-r-PFDMS(polystyrene-r-poly(ferrocenyl-dimethylsilane)), PS-r-PtBA(polystyrene-r-poly(tert-butylacrylate)), PS-r-PFEMS(polystyrene-r-poly(ferrocenylethylmethylsilane)), PI-r-PEO(polyisoprene-r-poly(ethyleneoxide)), PB-r-PVP(polybutadiene-r-poly(butadiene-r-vinylpyridinium)), PtBA-r-PCEMA(poly(tert-butylacrylate)-r-poly(cinnamoyl-ethylmethacrylate)), PS-r-PLA(polystyrene-r-polyactide), P α MS-r-PHS(poly(α-methylstyrene)-r-poly(4-hydroxystyrene)), PPDPS-r-P4VP (pentadecyl phenol modified polystyrene-r-poly(4-vinylpyridine)), PS-r-PEO(poly(styrene-r-ethyleneoxide)), PS-r-PDMS(polystyrene-r-poly(dimethyl siloxane)), PS-r-PE(polystyrene-r-polyethylene)), PS-r-PFS(polystyrene-r-poly(ferrocenyl dimethyl silane)), PS-r-PPP(polystyrene-r-poly(paraphenylene)), PS-r-PB-r-P S, PS-r-PI-r-PS, PEO-r-PPO(Poly(propyleneoxide))-r-PEO, PVPDMP S(poly(4-vinyl-phenyldimethyl-2-propoxysilane))-r-PI-r-PVPDMPS, or PS-r-P2VP-r-PtBMA, for example, but is not limited thereto.

Further, surfaces of the second and fourth guide partitions 131W' and 131R' may be treated as hydrophobic surfaces. In an exemplary embodiment, the hydrophobic surface treatment of the second and fourth guide partitions 131W' and 131R' may be performed through a fluoro polymer coating process or a fluoro gas plasma process, but is not limited thereto. In an exemplary embodiment, the hydrophobic surface treatment of the second and fourth guide partitions 131W' and 131R' may be performed before the neutral layer (not illustrated) is provided.

Figure 5:
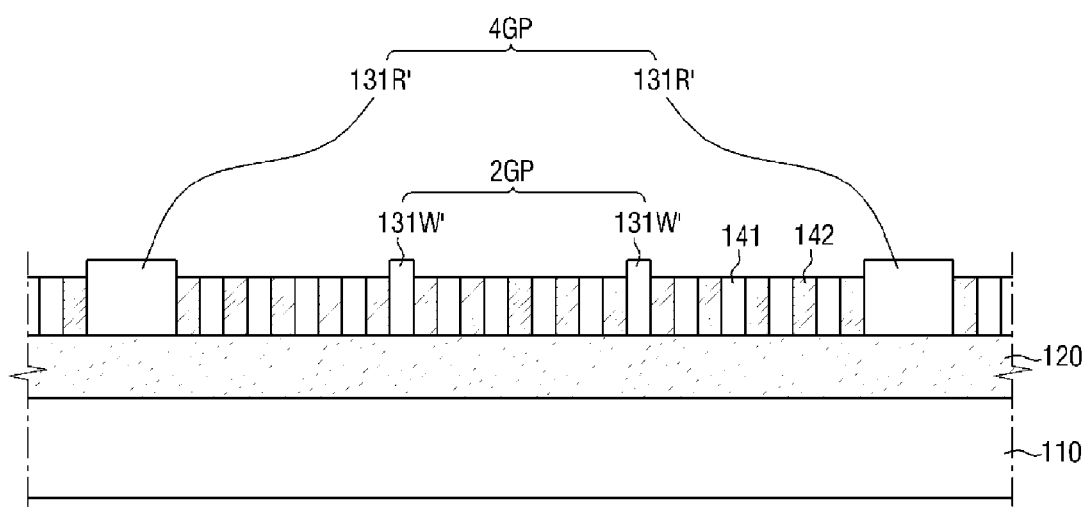

Referring to FIGS. 4 and 5, by self-assembling the block copolymer layer 140, the self-assembled block copolymer nanostructure, in which the first domains 141 and the second domains 142 are alternately arranged, may be provided.

The self-assembled block copolymer nanostructure may include the first domains 141 and the second domains 142. The first domains 141 may include the first repetition units, and the second domains 142 may include the second repetition units. The first domains 141 may be provided through self-assembling of the first repetition units, and the second domains 142 may be provided through self-assembling of the second repetition units.

In an exemplary embodiment, the self-assembling process of the block copolymer 140 may be performed, for example, through annealing. In an exemplary embodiment, the annealing includes thermal annealing and solvent annealing, for example. The thermal annealing is a method to guide microphase separation through heating over a glass transition temperature Tg of the block copolymer, and the solvent annealing is a method to guide microphase separation by giving liquidity to polymer chains through exposure of a polymer thin film including the block copolymer under solvent vapor.

In an exemplary embodiment, in the case of performing a process using the solvent annealing, the first and third guide partitions 131W and 131R (in FIG. 2) may be provided so that the height thereof after the trimming process thereof becomes equal to or higher than 2.5 times the height of the block copolymer layer 140, for example. Since swelling occurs as the solvent vaporized in the solvent annealing process infiltrates into the block copolymer, it is required to secure the above-described height so as to prevent the block copolymer from flowing out of the second trench T' (in FIG. 3) over the second and fourth guide partitions 131W' and 131R' (in FIG. 3).

Figure 6:
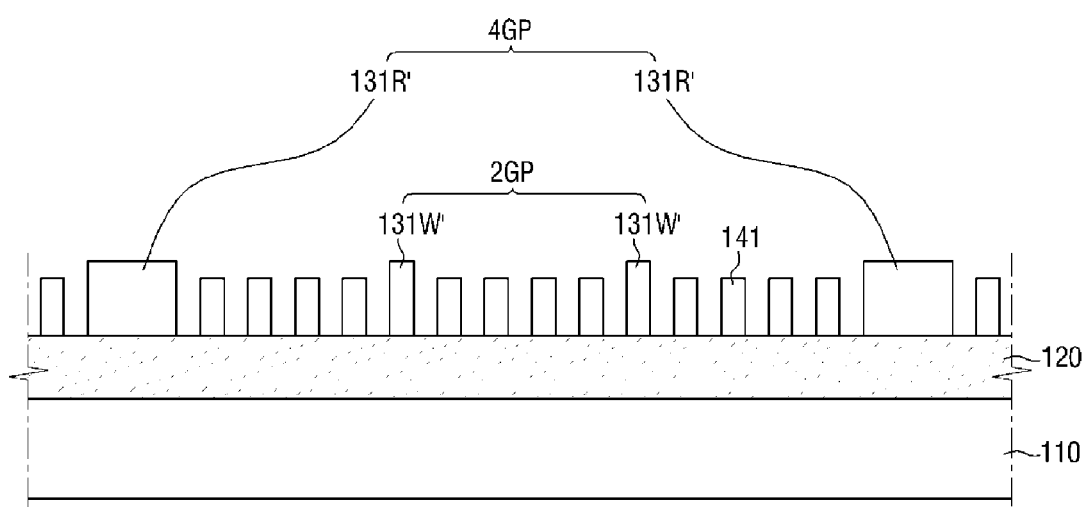

Referring to FIGS. 5 and 6, only the second domains 142 among the first domains 141 and the second domains 142 may be selectively removed. In an exemplary embodiment, a process of selectively removing the second domains 142 among the first domains 141 and the second domains 142 may be performed using a solvent having high affinity to the second domains 142, but is not limited thereto. Only the second domains 142 may be selectively removed through a dry etching process. In an exemplary embodiment, a gas that can be used in the dry etching may include at least one of oxygen ($O_2$), fluorocarbon gas, and hydrogen fluoride (HF), for example, but is not limited thereto. In an exemplary embodiment, the fluorocarbon gas may include at least one of $C_4F_8$, $CHF_3$, $CH_2F_2$, $C_4F_8$, $CF_4$, and $C_2F_6$, for example, but is not limited thereto.

Referring to FIGS. 6 to 10, a conductive pattern layer may be provided by patterning the conductive layer 120 using the second and fourth guide partitions 131W' and 131R' and the first domains 141 as a mask. The conductive pattern layer may include linear lattice patterns PT and reflective patterns RF.

The linear lattice patterns PT may be provided so that conductive partitions 121D and 121W are spaced apart from each other at an interval of a period that is shorter than the wavelength of an incident light. The linear lattice patterns PT may transmit a first polarized light of the incident light and may reflect a second polarized light that is perpendicular to the first polarized light. In an exemplary embodiment, the first polarized light may be a P-wave polarized light that is perpendicular to the conductive partitions 121D and 121W, and the second polarized light may be an S-wave polarized light that is in parallel to the conductive partitions 121W and 121D, for example.

In an unlimited exemplary embodiment, the conductive partitions 121W and 121D may have a line width of about 50 nanometers (nm) or less, a thickness of about 150 nm or more, and a pitch of about 100 nm, for example.

The conductive partitions 121D may be provided through patterning of the conductive layer 120 of a region that is protected by the first domains 141, and the conductive partitions 121W may be provided through patterning of the conductive layer 120 of a region that is protected by the second guide partitions 131W'. The reflective patterns RF may be provided through patterning of the conductive layer 120 of a region that is protected by the fourth guide partitions 131R'. The reflective patterns RF may reflect both the first polarized light and the second polarized light of the incident light. The second polarized light that is reflected by the linear lattice patterns PT may be re-reflected by the reflective patterns RF to be incident to the linear lattice patterns PT. As described later, the reflective patterns RF may be arranged between the linear lattice patterns PT. This will be described in detail with reference to FIGS. 11 to 13.

Figure 7:
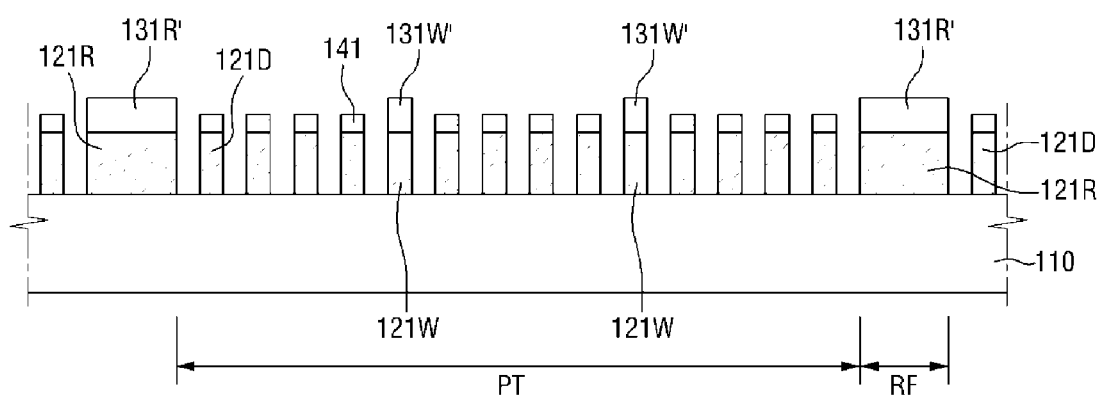

The wire grid polarizer plate of FIG. 7 may include the light permeable substrate 110, the conductive partitions 121D, 121W, and 121R that are arranged in parallel to project from the light permeable substrate 110, the second and fourth guide partitions 131W' and 131R' positioned on the conductive partitions 121W and 121R, and the first domains 141 positioned on the conductive partitions 121D.

In the case where etching is performed in a range in which the second and fourth guide partitions 131W' and 131R' and the first domains 141 are not completely removed to prevent over-etching, the second and fourth guide partitions 131W' and 131R' and the first domains 141 may remain on the conductive partitions 121D, 121W, and 121R.

The first domains 141 may be repeatedly arranged to be adjacent to each other between the second guide partitions 131W'. The first domains 141 may be repeatedly arranged to be adjacent to each other between the second guide partitions 131W' and the fourth guide partitions 131R'.

Figure 8:
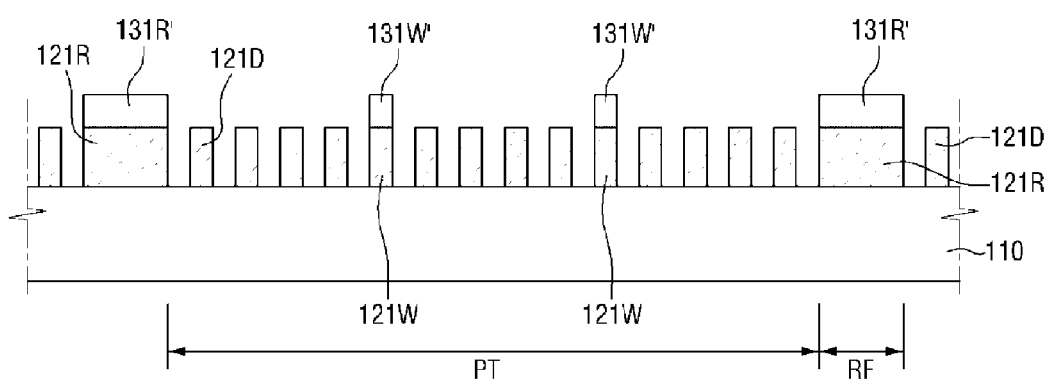

The wire grid polarizer plate of FIG. 8 may include the light permeable substrate 110, the conductive partitions 121D, 121W, and 121R that are arranged in parallel to project from the light permeable substrate 110, the second and fourth guide partitions 131W' and 131R' positioned on the conductive partitions 121W and 121R. The wire grid polarizer plate of FIG. 8 is different from the wire grid polarizer plate of FIG. 7 on the point that the first domains 141 are not arranged on the conductive partitions 121D.

The second and fourth guide partitions 131W' and 131R' may be arranged so that the conductive partitions 121D are interposed between them.

Figure 9:
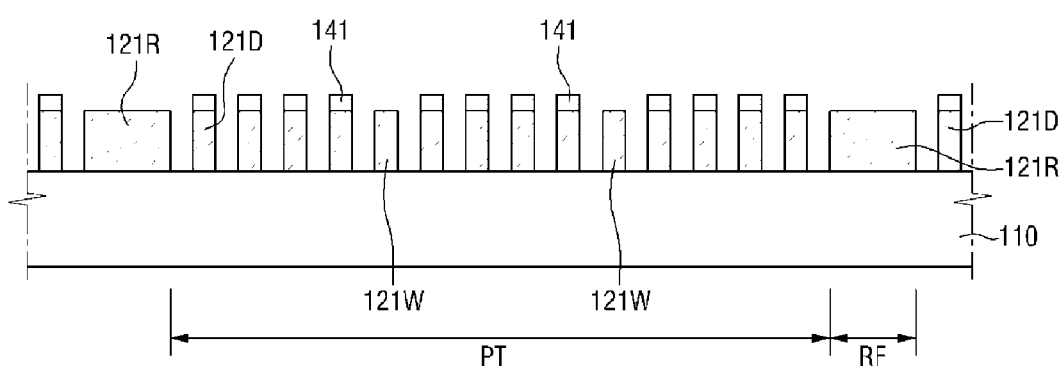

The wire grid polarizer plate of FIG. 9 may include the light permeable substrate 110, the conductive partitions 121D, 121W, and 121R that are arranged in parallel to project from the light permeable substrate 110, and the first domains 141 positioned on the conductive partitions 121D.

The wire grid polarizer plate of FIG. 9 is different from the wire grid polarizer plate of FIG. 7 on the point that the second and fourth guide partitions 131W' and 131R' are not arranged on the conductive partitions 121W and 121R.

The first domains 141 may be arranged at a predetermined interval between the conductive partitions 121W and 121R.

Figure 10:
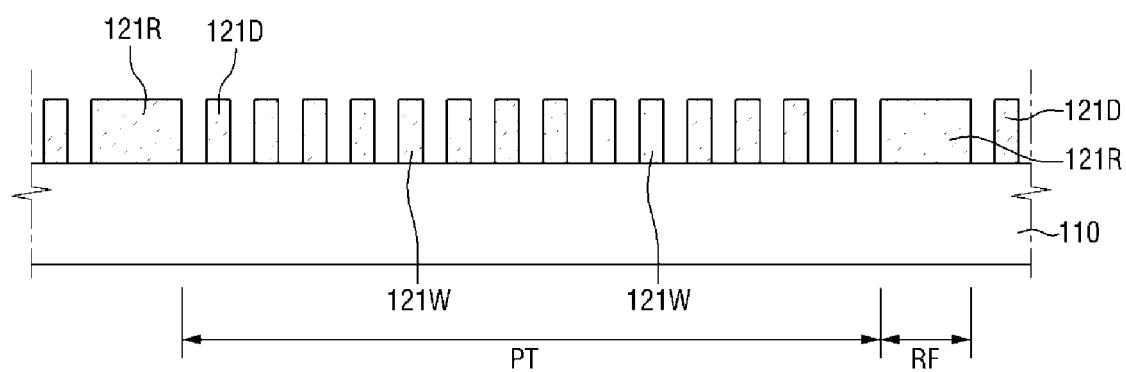

The wire grid polarizer plate of FIG. 10 may include the light permeable substrate 110, and the conductive partitions 121D, 121W, and 121R that are arranged in parallel to project from the light permeable substrate 110.

By removing the second and fourth guide partitions 131W' and 131R' and the first domains 141, which remain on upper portions of the conductive partitions 121D, 121W, and 121R, only the conductive partitions 121D, 121W, and 121R may remain on the light permeable substrate 110.

Figure 11:
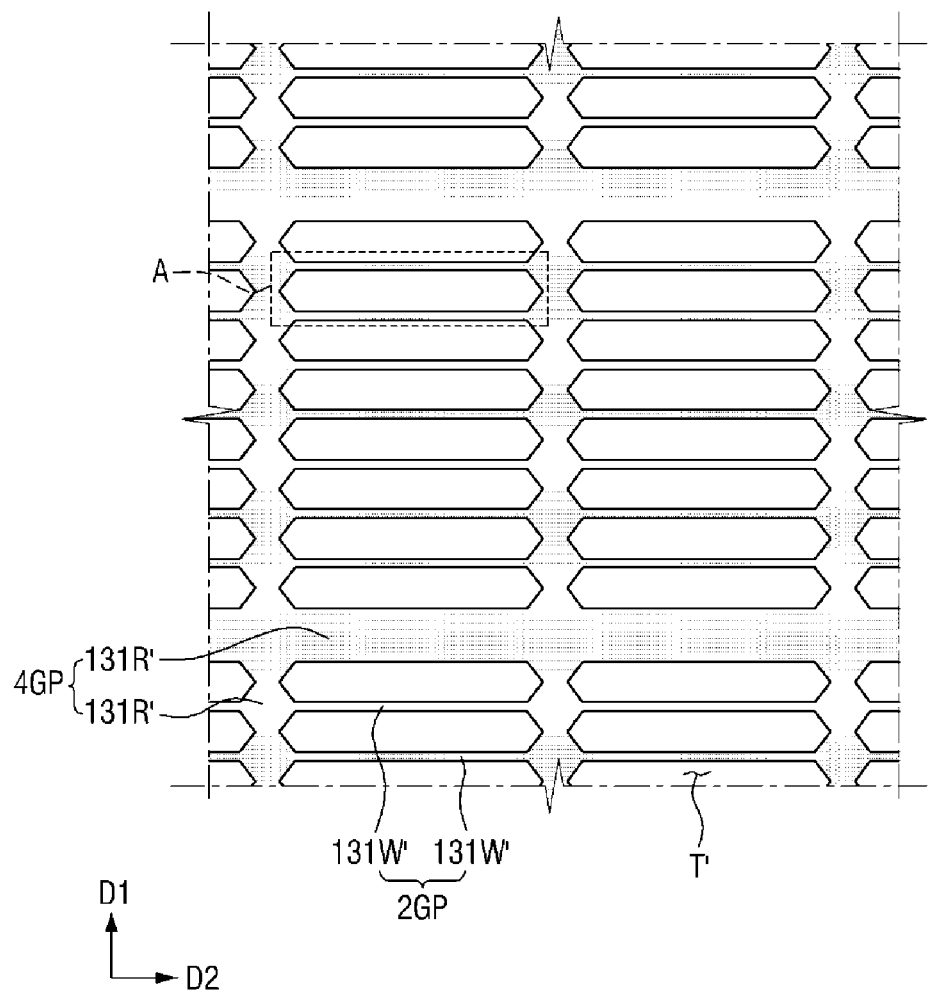
FIG. 11 is a plan view of a processed product of FIG. 5.
Figure 12:
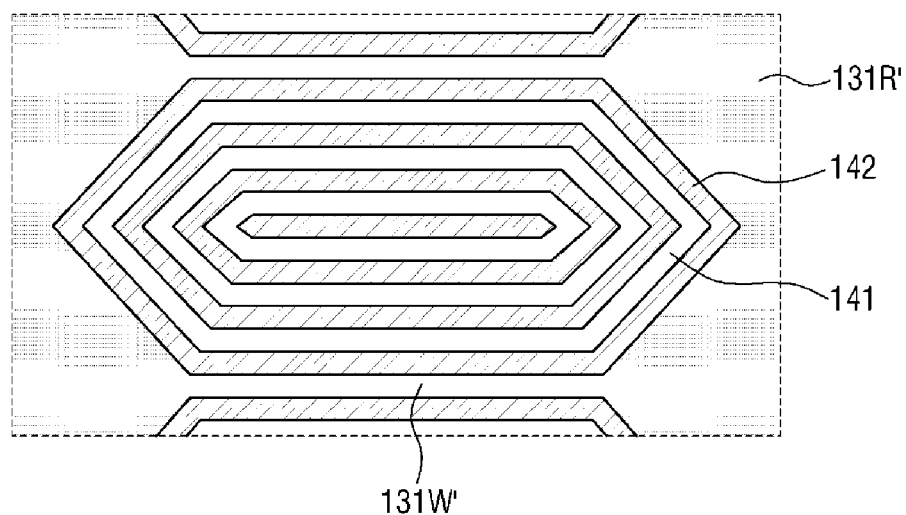
FIG. 12 is an enlarged view of region A of FIG. 11.

FIG. 11 is a plan view of a processed product of FIG. 5, and FIG. 12 is an enlarged view of region A of FIG. 11.

Referring to FIG. 11, second guide patterns 2GP including second guide partitions 131W' may be spaced apart from each other in a second direction D2, and fourth guide patterns 4GP including fourth guide partitions 131R' may be spaced apart from each other in the first direction D1 or second direction D2 so that second trenches T' are interposed between the fourth guide patterns 4GP. The second guide patterns 2GP may be connected to the fourth guide patterns 4GP.

In an exemplary embodiment, the second trench T' may be provided in a region that is surrounded by the second guide pattern 2GP and the fourth guide pattern 4GP, and may be provided, for example, in a straight hexagonal shape. However, the invention is not limited thereto, and the second trench T' may include various other shapes.

Referring to FIG. 12, self-aligned block copolymer nanostructures may be provided in the second trench T'. The self-aligned block copolymer nanostructure may include the first domains 141 and the second domains 142. The first domains 141 and the second domains 142 may provide first target patterns including polymer simple closed curves surrounding in piles, spaced apart from each other in the second trench T'.

In an exemplary embodiment, as illustrated in FIG. 12, straight hexagonal polymer simple closed curves of the first domains 141 and straight hexagonal polymer simple closed curves of the second domains 142 may be arranged in piles, spaced apart from each other in the second trench T' to provide the first target patterns, for example. The straight hexagonal polymer simple closed curves of the second domains 142 may surround outlines of the straight hexagonal polymer simple closed curves of the first domains 141 that are arranged on the inside, and the straight hexagonal polymer simple closed curves of the first domains 141 may surround outlines of the straight hexagonal polymer simple closed curves of the second domains 142 that are arranged on the inside so as to provide the first target patterns.

On the inside of the straight hexagonal polymer simple closed curves on the innermost side of the first target patterns, the linear first domains 141, the linear second domains 142, or the linear first and second domains 141 and 142 may be arranged. That is, parts of the first domains 141 and the second domains 142 may not provide the straight hexagonal polymer simple closed curve.

Figure 13:
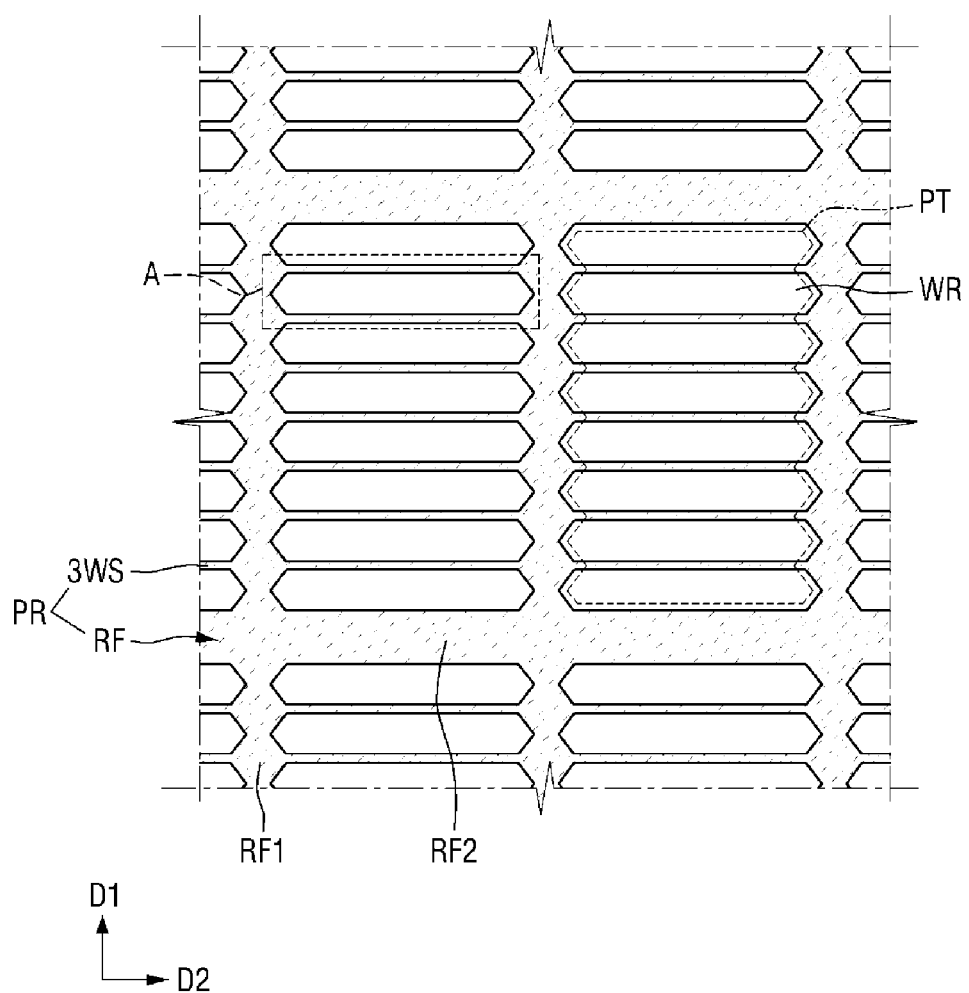
FIG. 13 is a plan view of a wire grid polarizer plate of FIG. 10.
Figure 14:
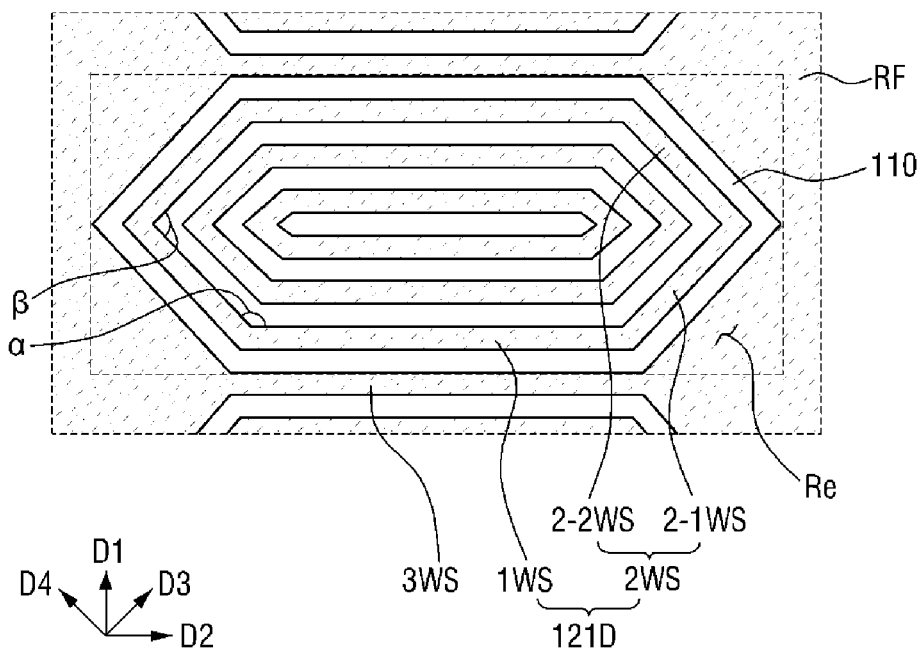
FIG. 14 is an enlarged view of region A of FIG. 13.

FIG. 13 is a plan view of a wire grid polarizer plate of FIG. 10, and FIG. 14 is an enlarged view of region A of FIG. 13. Referring to FIGS. 11 to 14, after the second domains 142 among the first domains 141 and the second domains 142 in the second trench T' are selectively removed, second target patterns may be provided in window regions WR using the first domains 141 as a mask, and third linear structures 3WS may be provided using the second guide partitions 131W' as a mask. Further, the reflective patterns RF may be provided using the fourth guide partitions 131R' as a mask.

Referring to FIGS. 13 and 14, the wire grid polarizer plate may include the window regions WR and a frame region PR arranged on outlines of the window regions WR. The window regions WR are regions that correspond to the second trench T' (in FIG. 11), and in the window regions WR, the second target patterns including conductive simple closed curves surrounding in piles, spaced apart from each other at an interval of a period which is shorter than a wavelength of incident light may be provided. The window regions WR may be arranged in the second direction D2.

The second target patterns may include two or more polygonal conductive simple closed curves in which two first linear structures 1WS that extend in one direction and spaced apart from each other and two or more second linear structures 2WS that do not extend in the one direction are connected to each other.

In an exemplary embodiment, the second target patterns may include the straight hexagonal conductive simple closed curves that are arranged in piles and spaced apart from each other, for example. The straight hexagonal conductive simple closed curve may be a simple closed curve in which two first linear structures 1WS that extend in the second direction D2 and spaced apart from each other in parallel, and four second linear structures 2WS that do not extend in the second direction D2 are connected to each other. The second linear structures 2WS may include two (2-1)-th linear structures 2-1WS that extend in a third direction D3 and two (2-2)-th linear structures 2-2WS that extend in a fourth direction D4. In an exemplary embodiment, an angle α that is defined between the first linear structures 1WS and the second linear structures 2WS may be an obtuse angle, for example. In an exemplary embodiment, an angle β that is defined between the (2-1)-th linear structures 2-1WS and the (2-2)-th linear structures 2-2WS may be an acute angle, for example.

The conductive simple closed curves of the first and second linear structures 1WS and 2WS may be provided in the same shape as the polymer simple closed curve of the first domains 141. Accordingly, the conductive simple closed curves of the first and second linear structures 1WS and 2WS may be changed in accordance with the shape of the polymer simple closed curve of the first domains 141. In an exemplary embodiment, in the case where the shape of the polymer simple closed curve of the first domains 141 is a straight octagon, the conductive simple closed curve of the first and second linear structures 1WS and 2WS may be a straight octagon, for example.

The frame region PR may include the third linear structures 3WS and the reflective patterns RF.

The third linear structures 3WS may be arranged between the window regions WR. Since the second target patterns may be provided in the window regions WR, the third linear structures 3WS may be arranged between the second target patterns. The third linear structures 3WS may extend in the second direction D2 in which the first linear structures 1WS extend.

The reflective patterns RF may include a first reflective region RF1 extending in the first direction D1, a second reflective region RF2 extending in the second direction D2, and a third reflective region Re disposed in a rectangular region (dotted line) that is circumscribed to the conductive simple closed curve on the outermost side of second target patterns.

Although not illustrated, data wirings (not illustrated) may extend in a direction that is in parallel to the first direction D1, and gate wirings (not illustrated) may extend in a direction that is in parallel to the second direction D2. The first reflective region RF1 may overlap the data wirings (not illustrated), and the second reflective region RF2 may overlap the gate wirings (not illustrated).

The third reflective region Re may be connected to the first reflective region RF1 or the second reflective region RF2. The third reflective region Re may extend areas of the reflective patterns as large as areas that are obtained by subtracting areas of the conductive simple closed curves of the second target patterns from an area of the rectangular region (dotted line), and such extension of the areas of the reflective patterns RF may heighten the reflection efficiency of the second polarized light.

The reflective patterns RF may be provided by patterning the conductive layer of the region that is protected by the fourth guide pattern 4GP, and may be connected to the third linear structures 3WS. The reflective patterns RF may be arranged between the linear lattice patterns PT.

Further, since the conductive simple closed curves of the first and second linear structures 1WS and 2WS can be provided in the same shape as the shape of the polymer simple closed curves of the first domains 141, the wire grid polarizer plate may further include fourth linear structures (not illustrated) that correspond to the linear first domains 141, the linear second domains 142, or the linear first and second domains 141 and 142 which may be arranged on the inner side of the rectangular polymer simple closed curves on the innermost side of the first target patterns. The fourth linear structures (not illustrated) may be arranged in the arrangement direction of the first linear structures 1WS.

Figure 15:
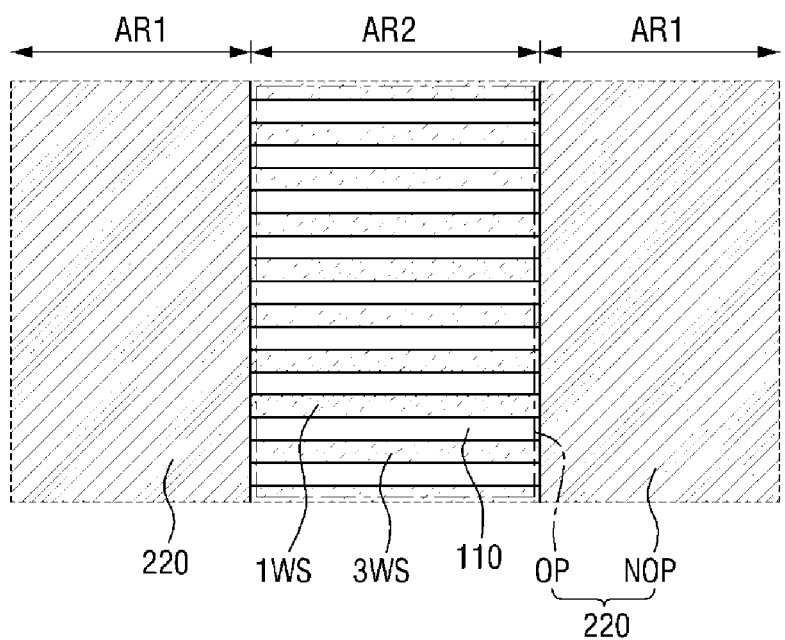
FIG. 15 is a plan view illustrating an arrangement of a wire grid polarizer plate and an opaque layer of FIG. 13.

FIG. 15 is a plan view illustrating an arrangement of a wire grid polarizer plate and an opaque layer of FIG. 11.

Referring to FIGS. 14 and 15, an opaque layer 220 may be arranged on an upper portion of a wire grid polarizer plate, and may include a non-opening NOP and openings OP. In an exemplary embodiment, the opaque layer 220 may be a black matrix, for example.

The non-opening NOP may cover the second linear structures 2WS of the second target patterns and the reflective patterns RF. First regions AR1 of the second target patterns may be covered by the non-opening NOP, and a second region AR2 may overlap the openings OP. Since the opaque layer 220 intercepts the incident light, the first polarized light that has penetrated the first regions AR1 of the second target patterns that are covered by the non-opening NOP is not emitted to an outside of the display device.

The first regions AR1 and the second region AR2 may be divided on the basis of the second linear structures 2WS of the conductive simple closed curves on the innermost side of the second target patterns as boundaries, and the first regions AR1 may include regions in which the second linear structures 2WS of the conductive simple closed curves on the innermost side of the second target patterns are arranged. The second linear structures 2WS may be covered by the non-opening NOP. According to circumstances, parts of the first linear structures 1WS that are connected to the second linear structures 2WS may be covered by the non-opening NOP.

The second region AR2 is a region in which the second linear structures 2WS of the conductive simple closed curves on the innermost side of the second target patterns are not arranged, and is arranged between the first regions AR1. The first linear structures 1WS are spaced apart from each other in a period that is shorter than the wavelength of the incident light in the second region AR2, and are arranged in parallel to the second direction D2.

Further, the third linear structures 3WS may be spaced apart from the first linear structures 1WS in a period that is shorter than the wavelength of the incident light in a region that overlaps the opening OP, and may be arranged in the second direction D2.

The light permeable substrate 110 may be arranged between the first linear structures 3WS and the third linear structures 3WS in the region that overlaps the opening OP.

Figure 16:
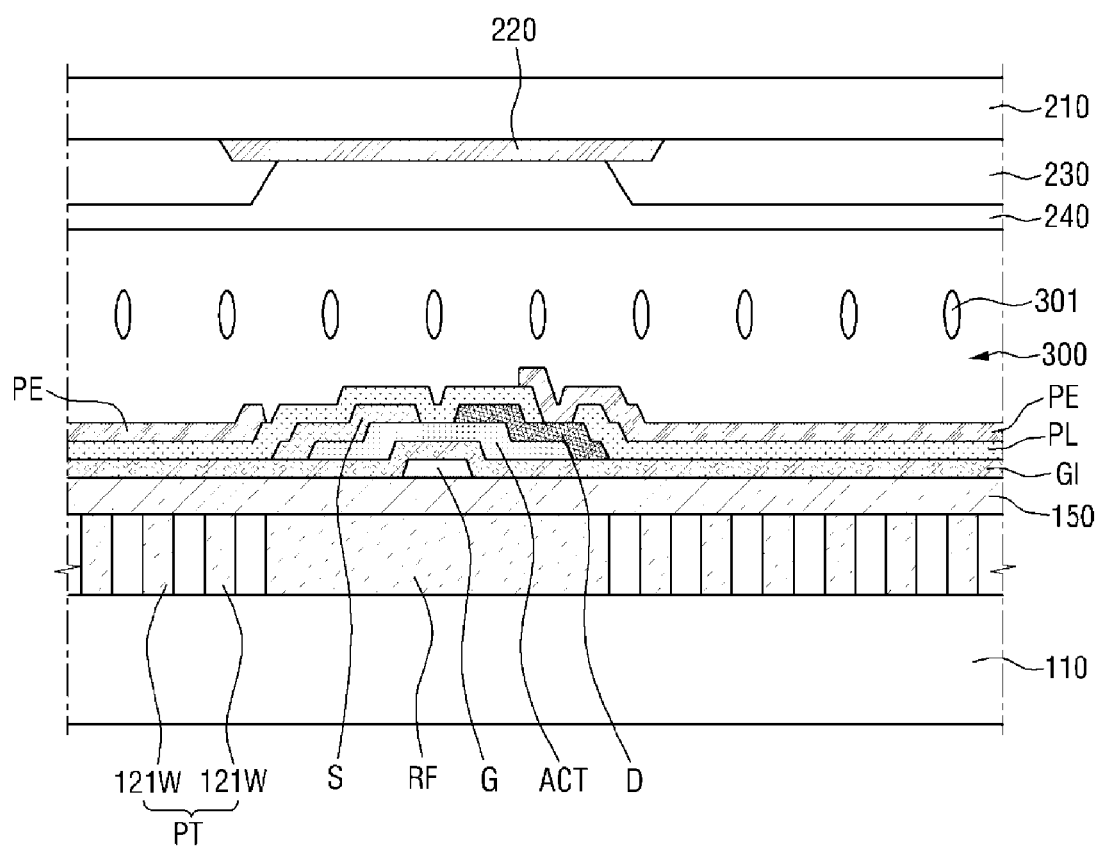
FIG. 16 is a cross-sectional view illustrating an arrangement of a wire grid polarizer plate and an opaque layer of FIG. 13.

FIG. 16 is a partial cross-sectional view of a display device illustrating an arrangement of a wire grid polarizer plate and an opaque layer 220 of FIG. 10.

Referring to FIG. 16, a wire grid polarizer plate may be arranged on a light permeable substrate 110, and a gate electrode G may be arranged on the wire grid polarizer plate. An insulating layer 150 may be arranged between the wire grid polarizer plate and the gate electrode G. The wire grid polarizer plate may be configured to include reflective patterns RF and linear lattice patterns PT, and the reflective patterns RF may be arranged in a region that overlaps an opaque layer 220. Linear lattice patterns PT that include conductive partitions 121W may be arranged in a region that overlaps a color filter 230.

A thin film transistor ("TFT") may be configured as below. The gate electrode G is positioned on the transparent substrate 110, and a gate insulating layer GI is positioned on the gate electrode G. A semiconductor layer ACT is positioned in a region of which at least a part overlaps the gate electrode G on the gate insulating layer GI, and a source electrode S and a drain electrode D are positioned on the semiconductor layer ACT and spaced apart from each other. A passivation layer PL is positioned on the gate insulating layer GI, the source electrode S, the semiconductor layer ACT, and the drain electrode D, and a pixel electrode PE is positioned on the passivation layer PL via a contact hole that exposes at least a part of the drain electrode D to be electrically connected to the drain electrode D.

A liquid crystal layer 300 that includes liquid crystal molecules 301 may be arranged on an upper portion of the thin film transistor, and a color filter substrate may be arranged on an upper portion of the liquid crystal layer 300. The color filter substrate may have a structure in which the opaque layer 220 and red, green, and blue color filters 230 are disposed on the light permeable substrate 210. An overcoat layer 240 may be arranged on the opaque layer 220 and the color filters 230. The light permeable substrate 220 may include a transparent insulating material, such as glass or plastic, and the opaque layer 220 may be a black matrix for preventing light leakage. The color filters 230 may be arranged on both ends of the opaque layer 220. Although not illustrated, a common electrode, which is an electric field generation electrode that includes a transparent conductive oxide, such as indium tin oxide ("ITO") or indium zinc oxide ("IZO"), may be further disposed on the overcoat layer 240.

The liquid crystal layer 300 serves to rotate the polarization axis of an incident light, and may be in a twisted nematic ("TN") mode having positive dielectric anisotropy, a vertical alignment ("VA") mode, or a horizontal alignment (in-plane switching ("IPS") or fringe field switching ("FFS")) mode, but is not limited thereto.

The display device may additionally include a backlight unit (not illustrated) that emits light, and an upper polarizer plate (not illustrated) that is arranged on an upper portion of the substrate 210.

The backlight unit may further include, for example, a light guide plate, a light source portion, a reflective member, and optical sheets.

The light guide plate ("LGP") is a portion that changes a path of light that is generated by the light source portion toward the liquid crystal layer, and may be provided with a light incident surface that is provided to make the light that is generated by the light source portion incident thereto and a light emission surface that is directed to the liquid crystal layer. The light guide plate may include a material having a predetermined refraction index, such as Poly Methyl Methacrylate ("PMMA") that is one of light penetrating materials or Polycarbonate ("PC"), but is not limited thereto.

Since the light which is incident to one side or both sides of the light guide plate that includes the above-described material has an angle that is within a critical angle of the light guide plate, it is incident to the inside of the light guide plate. When the light is incident to an upper surface or a lower surface of the light guide plate, the angle of the light deviates from the critical angle, and thus the light is not emitted to the outside of the light guide plate, but is uniformly transferred to the inside of the light guide plate.

A scattering pattern may be disposed on any one of the upper and lower surfaces of the light guide plate, for example, on the lower surface that is opposite to the light emission surface, so that the guided light can be emitted to the upper portion thereof. That is, the scattering pattern may be printed, for example, with ink, on one surface of the light guide plate so that the light that is transferred from the inside of the light guide plate can be emitted to the upper portion thereof. The scattering pattern may be provided by printing ink, but is not limited thereto. Micro grooves or projections may be defined in the light guide plate, or various modifications thereof can be made.

A reflective member may be further provided between the light guide plate and a bottom portion of a lower accommodation member. The reflective member serves to re-reflect the light that is emitted to the lower surface of the light guide plate, i.e., to an opposite surface that faces the light emission surface, and to supply the reflected light to the light guide plate. The reflective member may be in a film shape, but is not limited thereto.

The light source portion may face the light incident surface of the light guide plate. When needed, the number of light source portions may be appropriately changed. In an exemplary embodiment, one light source portion may be provided only on one side surface of the light guide plate, or three or more light source portions may be provided to correspond to three or more of four side surfaces of the light guide plate. Further, it may also be possible to provide a plurality of light source portions that corresponds to any one of the side surfaces of the light guide plate. As described above, a side light type that is a type in which light sources are positioned on the side surfaces of the light guide plate has been exemplified. However, in addition, a direct type or a surface-shaped light source type may be provided depending on the backlight configuration.

In an exemplary embodiment, the light source may include a white LED that emits white light, or a plurality of LEDs that emits red (R) light, green (G) light, and blue (B) light, respectively, for example. When a plurality of light sources is implemented by LEDs that emit the red (R) light, green (G) light, and blue (B) light, respectively, the LEDs may be simultaneously turned on to implement white light through color mixing.

The second target patterns may be non-polygonal simple closed curves of two first linear structures that extend in one direction and two or more second linear structures that do not extend in the one direction. The non-polygonal simple closed curve may include a modified straight hexagonal simple closed curve of which at least one short side is a curve.

Figure 17:
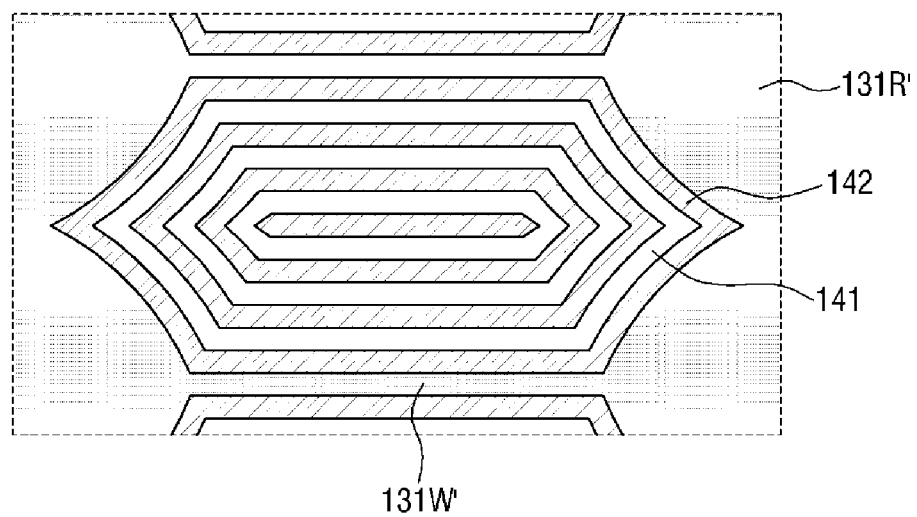
FIG. 17 is a view illustrating a first modified example of FIG. 12.
Figure 18:
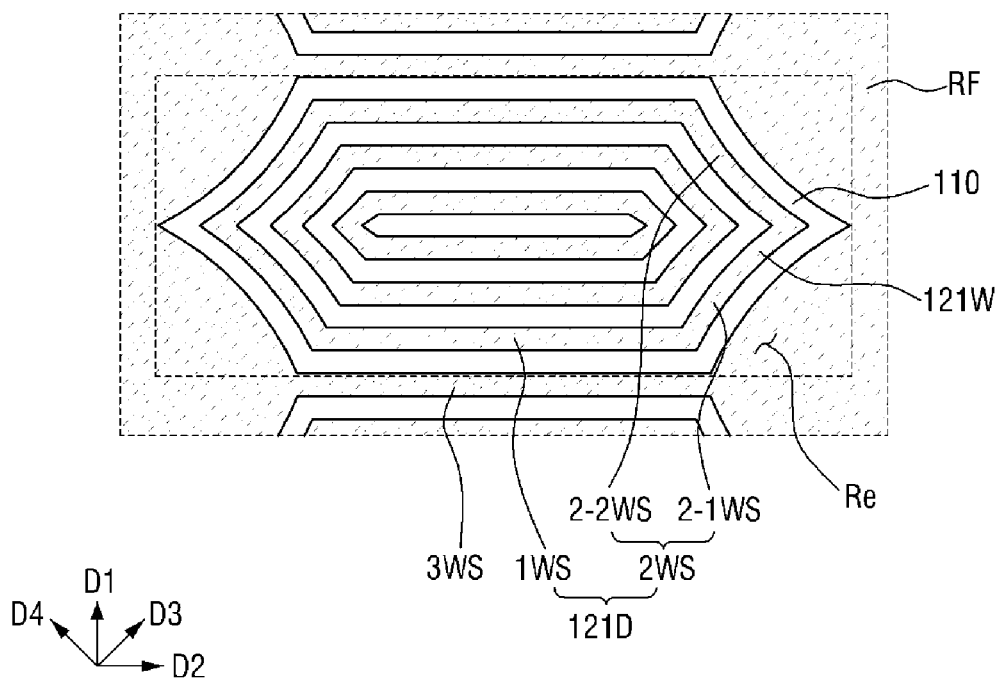
FIG. 18 is a view illustrating a first modified example of a wire grid polarizer plate of FIG. 14.

FIG. 17 is a view illustrating a first modified example of FIG. 12, and FIG. 18 is a view illustrating a first modified example of a wire grid polarizer plate of FIG. 14.

Referring to FIG. 17, the first target patterns may have a structure in which the first domains 141 that include modified straight hexagonal polymer simple closed curves and the second domains 142 that include modified straight hexagonal polymer simple closed curves are arranged in piles and spaced apart from each other. The modified straight hexagonal polymer simple closed curve may be a modified straight hexagonal simple closed curve of which short sides are modified into curves.

The second target patterns of FIG. 18 may include modified straight hexagonal simple closed curves having the same shape as the polymer simple closed curves of the first domains 141. Referring to FIG. 18, the second target patterns may include at least two conductive simple closed curves including two first linear structures 1WS that are in parallel to each other, two (2-1)-th linear structures 2-1WS that are in a curved shape, and two (2-2)-th linear structures 2-2WS that are in a curved shape. The second target patterns of FIG. 18 are different from the second target patterns of FIG. 14 on the point that the (2-1)-th linear structures 2-1WS and the (2-2)-th linear structures 2-2WS are in a curved shape whereas the second linear structures 2WS are in a linear shape.

Figure 19:
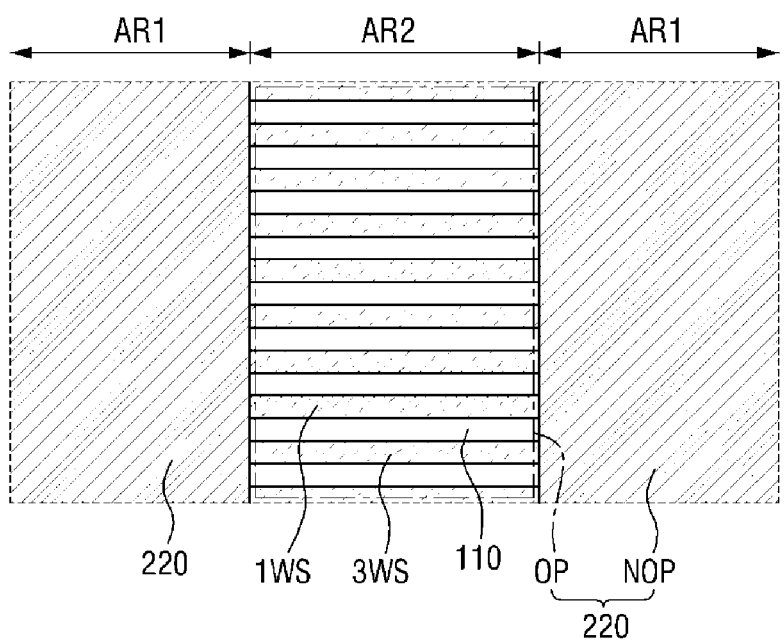
FIG. 19 is a plan view illustrating an arrangement of a wire grid polarizer plate and an opaque layer of FIG. 18.

FIG. 19 is a plan view illustrating an arrangement of a wire grid polarizer plate and an opaque layer of FIG. 18.

Referring to FIG. 19, the arrangement of the wire grid polarizer plate and the opaque layer of FIG. 18 is the same as the arrangement of the wire grid polarizer plate and the opaque layer of FIG. 14 as described above with reference to FIG. 15 except that the (2-1)-th linear structures 2-1WS and the (2-2)-th linear structures 2-2WS, which are in a curved shape, are arranged in the first regions AR1, and the non-opening NOP covers the (2-1)-th linear structures 2-1WS and the (2-2)-th linear structures 2-2WS, which are in a curved shape.

Figure 20:
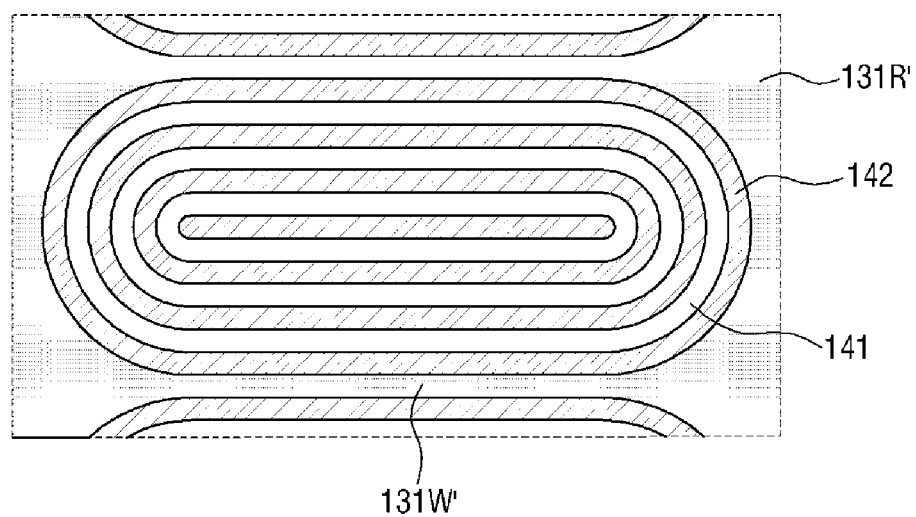
FIG. 20 is a view illustrating a second modified example of FIG. 12.
Figure 21:
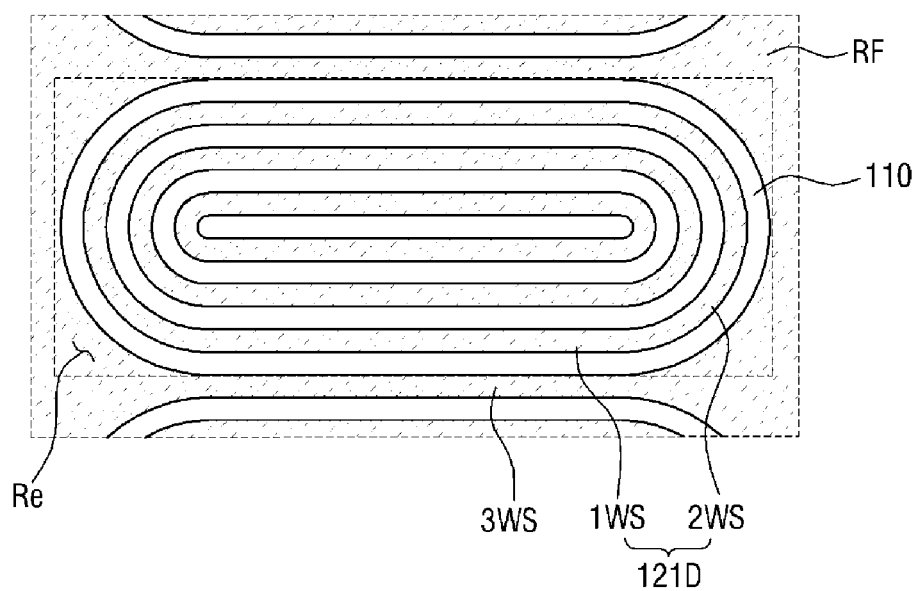
FIG. 21 is a view illustrating a second modified example of a wire grid polarizer plate of FIG. 14.

FIG. 20 is a view illustrating a second modified example of FIG. 12, and FIG. 21 is a view illustrating a second modified example of a wire grid polarizer plate of FIG. 14.

Referring to FIGS. 20 and 21, the first and second target patterns may have a structure in which at least two simple closed curves including two circular arch type structures are arranged in piles and spaced apart from each other. The first and second target patterns of FIGS. 20 and 21 are different from the first and second target patterns of FIGS. 12 and 14 on the point that the target patterns of FIGS. 20 and 21 include the simple closed curves of the two circular arch type structures whereas the target patterns of FIGS. 12 and 14 include the straight hexagonal simple closed curves. The arch type structure may have a structure that includes a curved portion and a support portion that supports the curved portion, and for example, the support portion may be in a linear shape.

Although not illustrated, the non-polygonal simple closed curves of the arch type structures are not limited to the simple closed curves of the two circular arch type structures, but may be two or more simple closed curves among a circular arch structure, a segment arch structure, a horseshoe arch structure, a pointed arch structure, and an ogee arch structure, circular simple closed curves, or elliptical simple closed curves.

Referring to FIG. 20, the first target patterns may have a structure in which the first domains 141 that include modified rectangular polymer simple closed curves and the second domains 142 that include modified rectangular polymer simple closed curves are arranged in piles and spaced apart from each other. The modified rectangular polymer simple closed curve may be a modified rectangular simple closed curve of which short sides are modified into curves.

The second target patterns of FIG. 21 may include modified rectangular simple closed curves having the same shape as the polymer simple closed curves of the first domains 141. Referring to FIG. 21, the second target patterns may include at least two conductive simple closed curves including two first linear structures 1WS that are in parallel to each other and two second linear structures 2WS that are in a circular arc shape. The second target patterns of FIG. 21 are different from the second target patterns of FIG. 14 on the point that the second linear structures 2WS are in a circular arc shape whereas the second linear structures 2WS of the second target patterns of FIG. 14 are in a linear shape.

Figure 22:
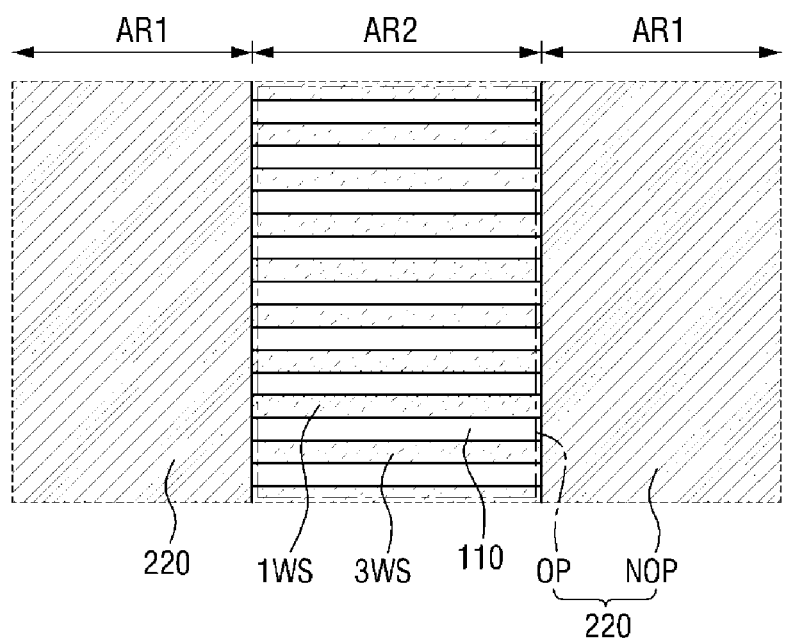
FIG. 22 is a plan view illustrating an arrangement of a wire grid polarizer plate and an opaque layer of FIG. 21.

FIG. 22 is a plan view illustrating an arrangement of a wire grid polarizer plate and an opaque layer 220 of FIG. 21.

Referring to FIG. 22, the arrangement of the wire grid polarizer plate and the opaque layer of FIG. 21 is the same as the arrangement of the wire grid polarizer plate and the opaque layer of FIG. 14 as described above with reference to FIG. 15 except that the second linear structures 2WS in a circular arc shape are arranged in the first regions AR1, and the non-opening NOP covers the second linear structures 2WS in a circular arc shape.

Figure 23:
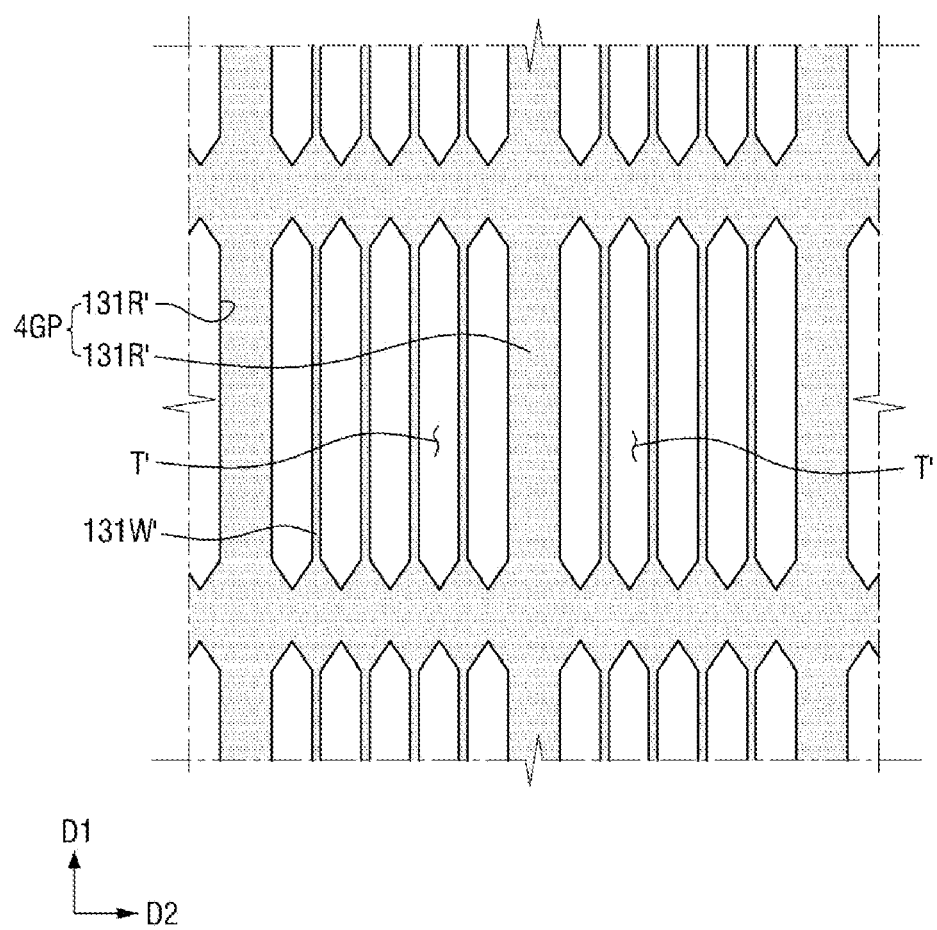
FIG. 23 is a plan view of a first modified example of a processed product of FIG. 11.

FIG. 23 is a plan view of a first modified example of a processed product of FIG. 11.

A processed product of FIG. 23 is different from the processed product of FIG. 11 on the point that the second guide partitions 131W' and the second trenches T' are arranged in parallel to the first direction D1 in the processed product of FIG. 23 whereas the second guide partitions 131W' and the second trenches T' are arranged in parallel to the second direction D2 in the processed product of FIG. 11.

Figure 24:
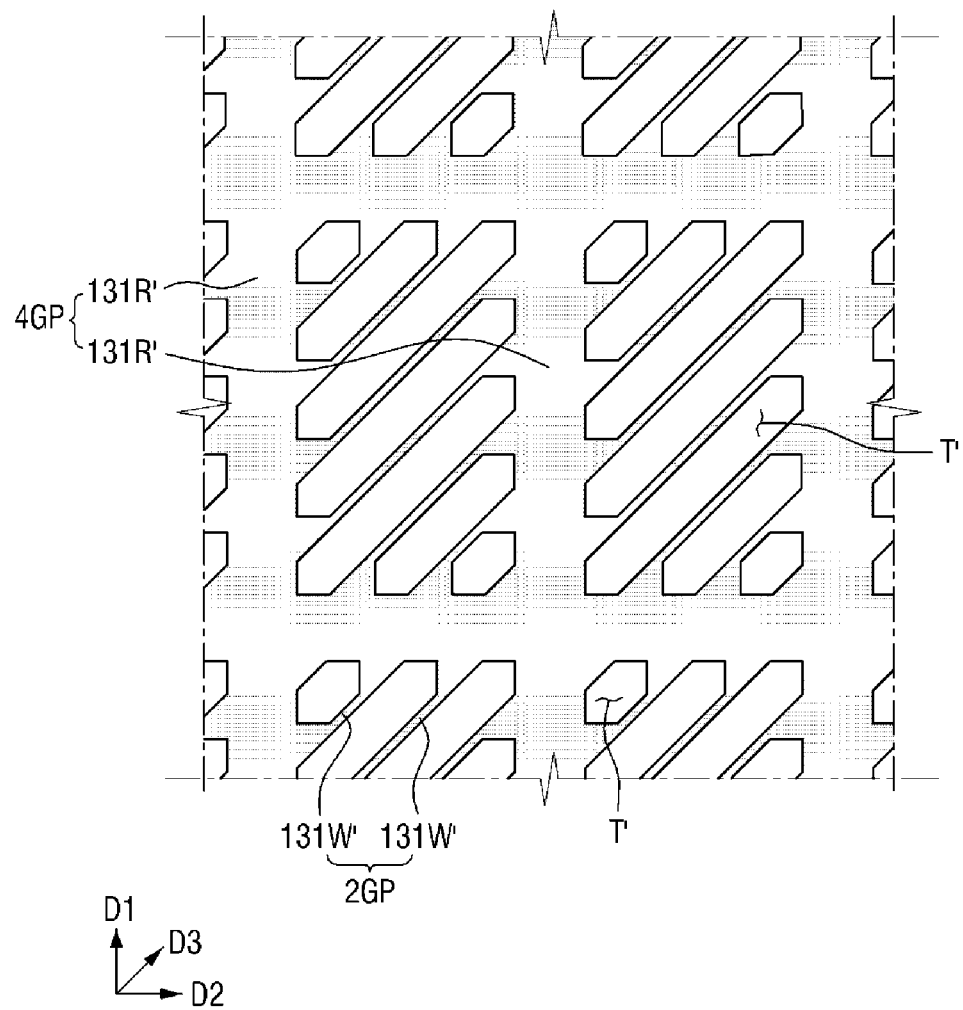
FIG. 24 is a plan view of a second modified example of a processed product of FIG. 11.

FIG. 24 is a plan view of a second modified example of a processed product of FIG. 11.

A processed product of FIG. 24 is different from the processed product of FIG. 11 on the point that the second guide partitions 131W' and the second trenches T' are arranged in parallel to the third direction D3 in the processed product of FIG. 24 whereas the second guide partitions 131W' and the second trenches T' are arranged in parallel to the second direction D2 in the processed product of FIG. 11.

FIGS. 25 to 34 are cross-sectional views explaining a method for fabricating a wire grid polarizer plate according to a second embodiment of the invention.

Figure 25:
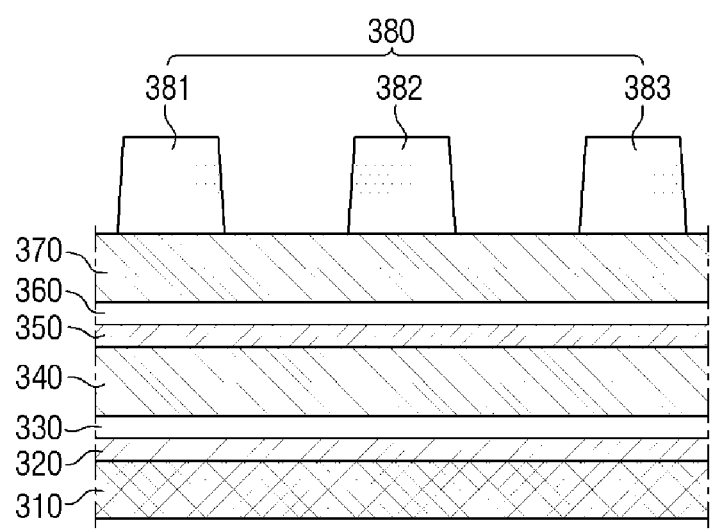
FIGS. 25 to 34 are cross-sectional views explaining an exemplary embodiment of a method for fabricating a wire grid polarizer plate according to the invention.

Referring to FIG. 25, a base substrate may include a light permeable substrate 310, conductive layers 320 and 330, a guide layer 340, a hard mask layer 350, a capping layer 360, and a sacrificial layer 370.

The light permeable substrate 310 can transmit visible light and the material of the light permeable substrate 310 can be properly selected to match the purpose or processing thereof. Since the light permeable substrate 310 has been described, the detailed explanation thereof will be omitted.

The conductive layers 320 and 330 may include any conductive material without limit. The conductive layers 320 and 330 may entirely cover the light permeable substrate 100. As described above, the conductive layers 320 and 330 may include the first conductive layer 320 and the second conductive layer 330.

In an exemplary embodiment, the first conductive layer 320 may include one of aluminum (Al), chrome (Cr), silver (Ag), copper (Cu), nickel (Ni), titanium (Ti), cobalt (Co), molybdenum (Mo), and an alloy thereof, but is not limited thereto.

The second conductive layer 330 may include a material having an etch rate that is lower than the etch rate of the first conductive layer 320. In an exemplary embodiment, the first conductive layer 320 may include aluminum, and the second conductive layer 330 may include titanium or molybdenum, but are not limited thereto.

The guide layer 340 may be disposed on the second conductive layer 330. The guide layer 340 may entirely cover the second conductive layer 330. The guide layer 340 may include a material having an etch rate that is higher than the etch rate of the second conductive layer 330. In an exemplary embodiment, the guide layer 340 may include silicon nitride (SiNx), for example, but is not limited thereto.

The hard mask layer 350 may be disposed on the guide layer 340. The hard mask layer 350 may entirely cover the guide layer 340. The hard mask layer 350 may include a material having an etch rate that is lower than the etch rate of the guide layer 340. In an exemplary embodiment, the hard mask layer 50 may include aluminum (Al), but is not limited thereto.

The capping layer 360 may be disposed on the hard mask layer 350. The capping layer 360 may entirely cover the hard mask layer 350. The capping layer 360 can prevent hillock phenomenon of the hard mask layer 350 from occurring. The capping layer 360 may include a material having an etch rate that is lower than the etch rate of the hard mask layer 350. The capping layer 360 may include titanium (Ti), but is not limited thereto. The capping layer 360 may be omitted.

The sacrificial layer 370 may be disposed on the hard mask layer 350. The sacrificial layer 370 may entirely cover the hard mask layer 350. The sacrificial layer 370 may include a material having an etch rate that is higher than the etch rate of the capping layer 360. In an exemplary embodiment, the sacrificial layer 370 may include silicon nitride (SiNx), for example, but is not limited thereto.

A first photosensitive film pattern layer 380 may be disposed on the sacrificial layer 370. In an exemplary embodiment, the first photosensitive film pattern layer 380 may be provided using a photolithography method, for example. First photosensitive film patterns 381, 382, and 383 may be arranged on the sacrificial layer 370 and spaced apart from one another, and parts of the sacrificial layer 370 may be exposed between the first photosensitive film patterns 381, 382, and 383.

Figure 26:
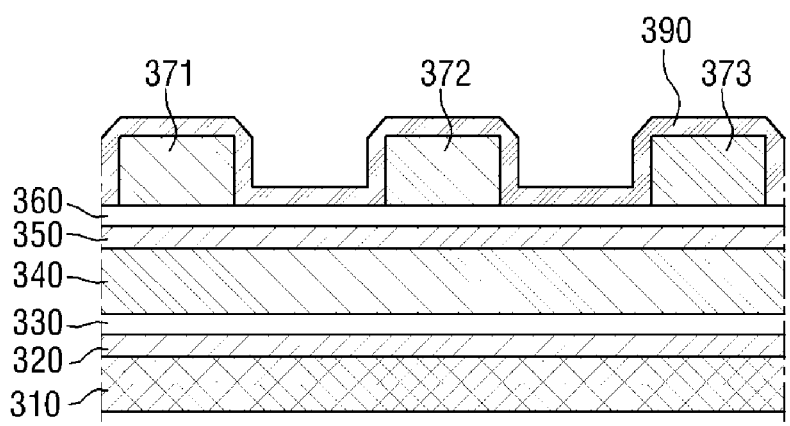

Referring to FIGS. 25 and 26, sacrificial layer patterns 371, 372, and 373 may be disposed on the capping layer 360. The sacrificial layer patterns 371, 372, and 373 may be provided by patterning the sacrificial layer 370 using the first photosensitive film patterns 381, 382, and 383 as a mask.

A spacer layer 390 may be disposed on the sacrificial layer patterns 371, 372, and 373 and the capping layer 360. The spacer layer 390 may entirely cover the sacrificial layer patterns 371, 372, and 373 and the capping layer 360 that is exposed between the sacrificial layer patterns 371, 372, and 373. In an exemplary embodiment, the spacer layer 390 may include silicon oxide (SiOx), for example.

Figure 27:
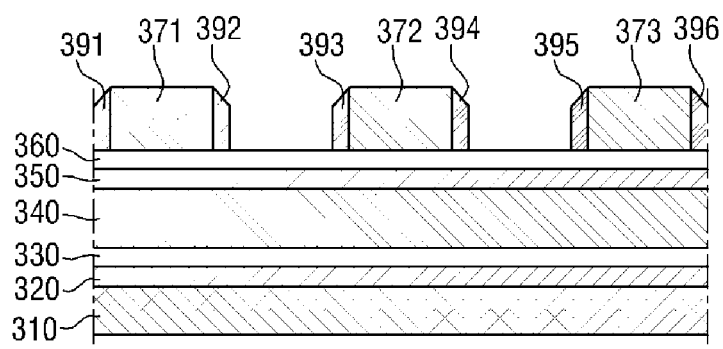

Referring to FIGS. 26 and 27, spacer patterns 391, 392, 393, 394, 395, and 396 may be provided by patterning the spacer layer 390. Specifically, the spacer patterns 391, 392, 393, 394, 395, and 396 may cover side surfaces of the sacrificial layer patterns 371, 372, and 373. Parts of the capping layer 360 may be exposed between the spacer patterns 391, 392, 393, 394, 395, and 396. Upper surfaces of the sacrificial layer patterns 371, 372, and 373 may be exposed between the spacer patterns 391, 392, 393, 394, 395, and 396.

Figure 28:
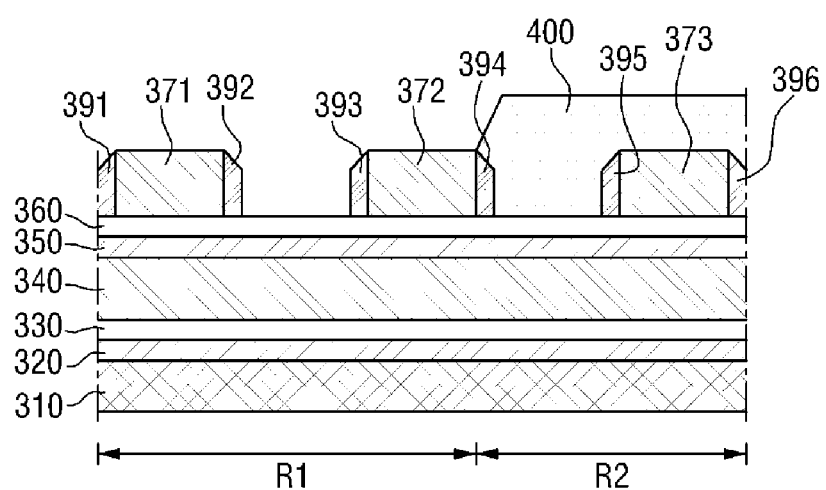

Referring to FIG. 28, a second photosensitive film pattern 400 may be disposed only on the second region R2 of the first and second regions R1 and R2. The first region R1 is a region in which a linear lattice pattern PT (in FIG. 34) is to be provided later, and the second region R2 is a region in which a reflective pattern RF (in FIG. 34) is to be provided later. In other words, the second photosensitive film pattern 400 can protect the region in which the reflective pattern RF (in FIG. 34) is to be provided.

Figure 29:
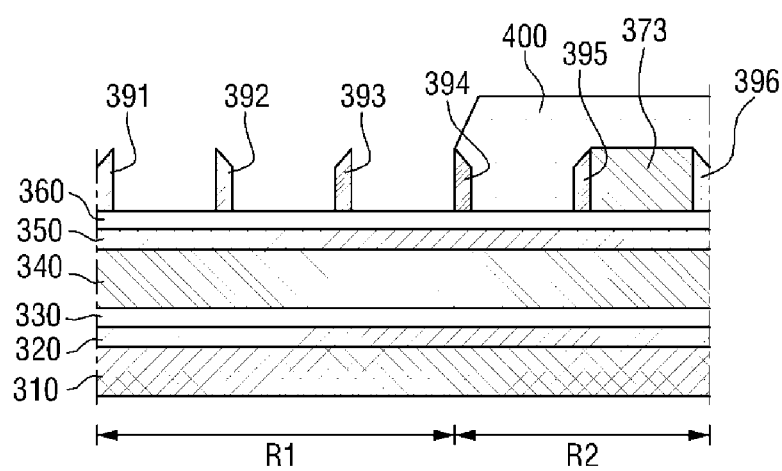

Referring to FIG. 29, the sacrificial layers 371 and 372 may be selectively removed from the first region R1 only. Since the sacrificial layer 373 is protected by the second photosensitive film pattern 400, the sacrificial layer 373 is not removed unlike the sacrificial layers 371 and 372. After the sacrificial layers 371 and 372 are removed, parts of the capping layer 360 may be exposed between the spacer patterns 394, 395, and 396 in the first region R1.

Figure 30:
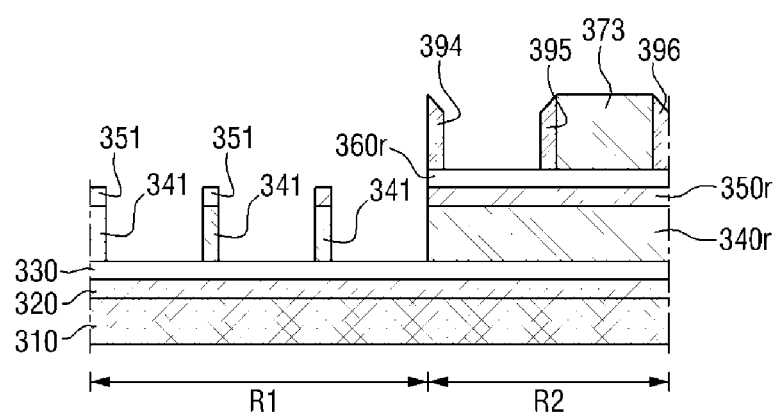

Referring to FIGS. 29 and 30, the hard mask layer 350 and the guide layer 340 in the first region R1 may be patterned using the spacer patterns 394, 395, and 396 as a mask in a state where the second region R2 is protected by the second photosensitive film pattern 400. In the first region R1, the first hard mask pattern 351 and a guide pattern 341 may be disposed on the second conductive layer 330. Although not illustrated, parts of the capping layer 360 may remain on the hard mask pattern 351.

The guide pattern 341 in the first region or the guide pattern 341 and the first hard mask pattern 351 may correspond to the first guide pattern 1GP (refer to FIG. 2) as described above.

The second photosensitive film pattern 400 may be removed after the first hard mask pattern 351 and the guide pattern 341 are provided. A first residual capping layer pattern 360r, a first residual hard mask pattern 350r, and a residual guide pattern 340r may be disposed in the second region R2 that is protected by the second photosensitive film pattern 400.

The residual guide pattern 340r or the first residual capping layer pattern 360r, the first residual hard mask pattern 350r, and the residual guide pattern 340r may correspond to the third guide pattern 3GP (refer to FIG. 2) as described above.

Figure 31:
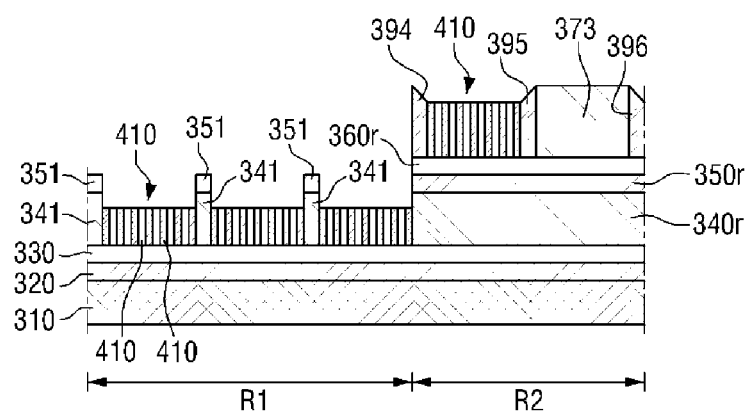

Referring to FIG. 31, a self-assembled block copolymer layer 410 may be disposed between the guide patterns 341 and between the spacer patterns 394 and 395. The self-assembled block copolymer layer 410 may include first domains 410a and second domains 410bSince the self-assembled block copolymer layer 410 has been described, the detailed explanation thereof will be omitted.

Although not illustrated, a neutral layer (not illustrated) may be disposed on a bottom portion of the trench, i.e., on the second conductive layer 330 in the trench, to control vertical alignment of first repetition units and second repetition units of the block copolymer. Since the neutral layer has been described, the detailed explanation thereof will be omitted.

Further, the surface of the guide pattern 341 may be treated as a hydrophobic surface. In an exemplary embodiment, the hydrophobic surface treatment of the guide pattern 341 may be performed through a fluoro polymer coating process or a fluoro gas plasma process, for example, but is not limited thereto.

Figure 32:
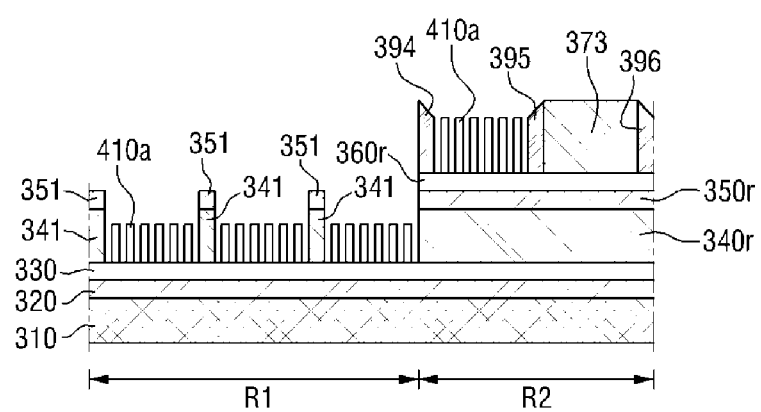

Referring to FIGS. 31 and 32, only the second domains 410b of the first and second domains 410a and 410b may be selectively removed. As an example, a process of selectively removing the second domains 410b of the first and second domains 410a and 410b may be performed using a solvent having high affinity as described above.

Figure 33:
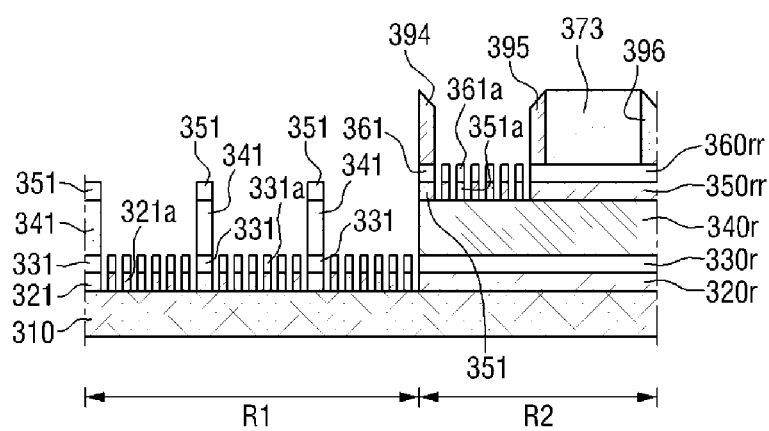

Referring to FIGS. 32 and 33, the conductive layers 320 and 330 may be patterned using the first domains 410a and the guide pattern 341 as a mask in the first region R1. First conductive pattern layers 321 and 321a and second conductive pattern layers 331 and 331a may be disposed in the first region R1. The first conductive pattern layers 321 and 321a may be arranged on lower portions of the second conductive pattern layers 331 and 331a.

In the second region R2, a first residual capping layer pattern 360r and a first residual hard mask pattern 350r may be patterned using the spacer patterns 394, 395, and 396 and the sacrificial layer pattern 373 as a mask. In the second region R2, capping layer patterns 361 and 361a, second hard mask patterns 351 and 351a, second residual capping layer pattern 360rr, and a second residual hard mask pattern 350rr may be provided. Further, as a result of patterning the conductive layers 320 and 330 in the first region R1, residual conductive patterns 320r and 330r may be disposed in the second region R2.

Figure 34:
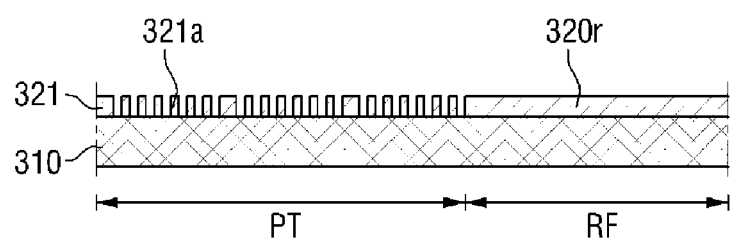

Referring to FIGS. 33 and 34, only the first conductive patterns 321 and 321a and the residual conductive pattern 320r may be disposed on the light permeable substrate 310.

The first conductive patterns 321 and 321a may provide the linear lattice pattern PT, and the residual conductive pattern 320r may provide the reflective pattern RF. The first conductive pattern 321a may correspond to the linear structures 121W (refer to FIG. 10) as described above, and the first conductive pattern layer 321 may correspond to the fourth linear structure 121R (refer to FIG. 10) as described above.

Although preferred embodiments of the invention have been described for illustrative purposes, those skilled in the art will appreciate that various modifications, additions and substitutions are possible, without departing from the scope and spirit of the invention as disclosed in the accompanying claims.

What is claimed is:

1. A display device comprising:
a wire grid polarizer plate including a light permeable substrate, a conductive pattern layer arranged on one surface of the light permeable substrate, the conductive pattern layer including window regions and at least one reflective region arranged in a rectangular region which is circumscribed to the window regions, the window regions having target patterns including conductive simple closed curves surrounding in piles, spaced apart from each other at an interval of a period which is shorter than a wavelength of incident light, transmitting first polarized light of the incident light and reflecting second polarized light which is perpendicular to the first polarized light and the reflective regions reflecting both of the first polarized light and the second polarized light; and
an opaque layer arranged on an upper portion of the wire grid polarizer plate,
wherein the target patterns include first linear structures which extend in one direction and second linear structures which do not extend in the one direction, and the opaque layer covers the second linear structures.

2. The display device of claim 1, wherein the conductive simple closed curves comprise polygonal simple closed curves which include the two first linear structures which extend in the one direction and the three or more second linear structures which do not extend in the one direction.

3. The display device of claim 2, further comprising third linear structures which extend in the one direction,
wherein the third linear structures are arranged between the window regions.

4. The display device of claim 2, wherein the polygonal simple closed curves are straight hexagonal simple closed curves.

5. The display device of claim 1, wherein the conductive simple closed curves comprise non-polygonal simple closed curves which include the two first linear structures which extend in the one direction and the two or more second linear structures which do not extend in the one direction.

6. The display device of claim 5, wherein the non-polygonal simple closed curves comprise arch structures.

7. The display device of claim 5, wherein the non-polygonal simple closed curves comprise modified straight hexagonal simple closed curves of which at least one short side includes a curve.

8. The display device of claim 5, further comprising third linear structures which extend in the one direction,
wherein the third linear structures are arranged between the window regions.

* * * * *